(12) United States Patent
Shi et al.

(10) Patent No.: US 9,983,853 B2
(45) Date of Patent: May 29, 2018

(54) CONTROLLING DATA LOGGING BASED ON A LIFECYCLE OF A PRODUCT

(71) Applicant: Facebook, Inc., Menlo Park, CA (US)

(72) Inventors: Weizhe Shi, Mountain View, CA (US); Yingyi Liang, San Mateo, CA (US); Gang Liu, San Jose, CA (US)

(73) Assignee: Facebook Inc., Menlo Park, CA (US)

( * ) Notice: Subject to any disclaimer, the term of this patent is extended or adjusted under 35 U.S.C. 154(b) by 105 days.

(21) Appl. No.: 14/699,602

(22) Filed: Apr. 29, 2015

(65) Prior Publication Data

US 2016/0321035 A1    Nov. 3, 2016

(51) Int. Cl.
G06F 9/44     (2018.01)
G06F 17/30    (2006.01)

(52) U.S. Cl.
CPC .......... G06F 8/22 (2013.01); G06F 17/30185 (2013.01); G06F 8/70 (2013.01)

(58) Field of Classification Search
None
See application file for complete search history.

(56) References Cited

U.S. PATENT DOCUMENTS

| | | | | |
|---|---|---|---|---|
| 6,023,507 A * | 2/2000 | Wookey | ............. | G06F 11/2294 380/285 |
| 7,962,901 B2 * | 6/2011 | McCamant | ......... | G06F 11/3612 703/22 |
| 8,578,041 B2 * | 11/2013 | Error | ...................... | H04L 67/22 709/223 |
| 8,904,361 B2 * | 12/2014 | Vertes | ................. | G06F 11/3476 717/130 |
| 8,955,038 B2 * | 2/2015 | Nicodemus | ............. | G06F 21/55 717/172 |
| 9,069,968 B2 * | 6/2015 | Aad | ....................... | G06F 21/577 |
| 9,282,048 B1 * | 3/2016 | Fichter | ................... | H04L 47/25 |
| 2002/0198983 A1 * | 12/2002 | Ullmann | ............. | G06F 11/0709 709/224 |
| 2004/0194077 A1 * | 9/2004 | Bharadwaj | .......... | G06F 11/3612 717/158 |

(Continued)

OTHER PUBLICATIONS

ISTQB Exam Certification Study Materials, ISTQBExamCertification.com, Jan. 2012.*

(Continued)

*Primary Examiner* — Chat Do
*Assistant Examiner* — Douglas Slachta
(74) *Attorney, Agent, or Firm* — FisherBroyles, LLP

(57) ABSTRACT

The embodiments are related to a log framework for controlling data sampling at client devices based on a lifecycle of a product. A product can be an application executing on a client device and/or a feature of the application. The sampling of data depends on a lifecycle of the product. For example, data may be sampled at a higher rate during a launch phase of the product, e.g., as more data may be required to analyze the behavior of the product, and then may be decreased to a lower rate when the product matures. Similarly, for a product that is in an experiment phase for a specified duration, data may be logged during the experiment phase, e.g., at a constant sampling rate, and then the logging may be terminated at the expiry of the experiment phase, thereby saving resources, e.g., processing capacity, storage capacity of the client device.

17 Claims, 15 Drawing Sheets

(56) References Cited

U.S. PATENT DOCUMENTS

| | | | | |
|---|---|---|---|---|
| 2006/0020918 A1* | 1/2006 | Mosberger | ......... | G06F 11/3409 717/124 |
| 2006/0130001 A1* | 6/2006 | Beuch | ................. | G06F 11/3466 717/130 |
| 2006/0174165 A1* | 8/2006 | Shaffer | ............... | G06F 11/3476 714/38.13 |
| 2007/0074081 A1* | 3/2007 | DeWitt, Jr. | ......... | G06F 11/3409 714/45 |
| 2007/0136339 A1* | 6/2007 | Garg | ....................... | G06Q 30/02 |
| 2008/0154547 A1* | 6/2008 | Levine | ................. | G06F 11/3466 702/187 |
| 2008/0244533 A1* | 10/2008 | Berg | .................. | G06F 11/3447 717/128 |
| 2009/0204645 A1* | 8/2009 | Machida | ............. | G06F 11/3419 |
| 2010/0070669 A1* | 3/2010 | Johnson | .................. | G06F 13/24 710/264 |
| 2010/0229157 A1* | 9/2010 | Ergan | ................ | G06F 11/0748 717/128 |
| 2011/0087927 A1* | 4/2011 | Arnold | ................. | G06F 11/366 714/38.1 |
| 2011/0239189 A1* | 9/2011 | Attalla | ...................... | G06F 8/65 717/121 |
| 2013/0166730 A1* | 6/2013 | Wilkinson | ............ | H04L 41/142 709/224 |
| 2013/0283246 A1* | 10/2013 | Krajec | ................ | G06F 11/3466 717/130 |
| 2014/0089354 A1* | 3/2014 | Gonsalves | .......... | H04M 3/2218 707/812 |
| 2014/0331092 A1* | 11/2014 | Taylor | ................. | G06F 11/0787 714/48 |
| 2015/0052503 A1* | 2/2015 | Ligman | ............... | G06F 11/3664 717/125 |

OTHER PUBLICATIONS

Landis et al., "Recommended Approach to Software Development", Jun. 1992, SOftware Engineering Laboratory, Revision 3.*

Ibrahim S. Yansaneh, Construction and use of sample weights, Nov. 2003.*

* cited by examiner

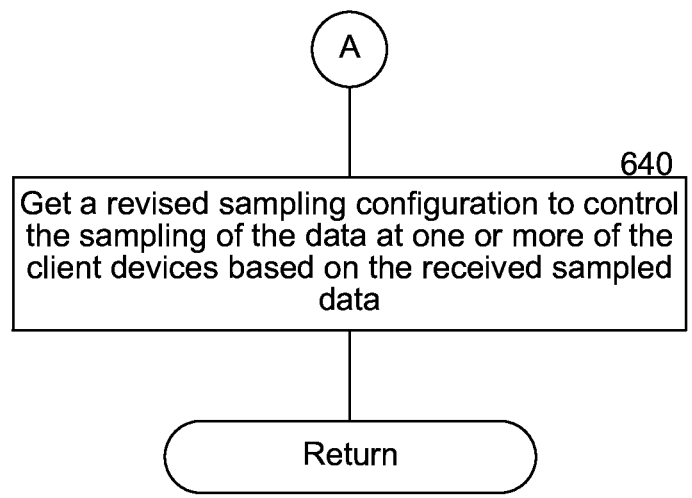
FIG. 6 (con't.)

CONTROLLING DATA LOGGING BASED ON A LIFECYCLE OF A PRODUCT

BACKGROUND

In computer programming, application programs are often instrumented to monitor or measure the level of a product's performance, diagnose errors, etc. Application developers can implement instrumentation in the form of code instructions that monitor specific components in a system. Instrumentation can be necessary to review the performance of the application, and often incorporates data logging. Current data-logging techniques can use a logging framework that provides an application program interface (API), which can be used by application developers for logging data in their application. When the application is executed, the log API generates a log file having the logged data. Current data-logging techniques generally instrument the source code and this can have some disadvantages. For example, if the application is deployed into production and if the data to be logged has to be changed, e.g., more data items have to be logged, or a frequency with which the data is to be logged has to be changed, the application has to be recompiled with new logging code and then deployed again. This can be very inefficient and resource intensive.

For example, if the application is developed as a mobile application ("app"), the app with new logging code is "pushed" to user's mobile devices ("client computing devices"), and downloading and installing the app can consume resources, e.g., network bandwidth, processing capacity, time and effort of the user. Further, the problem can be amplified if the data logging is changed frequently, which may be the case in new apps or when new features are added to an app and different data may be needed for monitoring the performance of the app. Some users may not update their apps for prolonged periods, which can cause data collection gaps or even errors. One way to avoid such a problem is to configure the app to log all the data items. However, this is also inefficient as too much logging of data can consume the computing resources of the user's device, which can be a significant problem in mobile devices considering the resources, e.g., battery, memory, are limited. Moreover, users may not appreciate that a portion of their bandwidth is consumed by data that is transmitted to the server.

Further, some data-logging techniques continue logging data even when they may not be needed anymore. The number of users who use the product and/or the volume of data being logged can be different in different lifecycle stages of the product. The data-logging techniques continue to log the data without regard to the lifecycle of the product and therefore, can end up consuming resources of the mobile devices of the users. For example, when a product is in a product launch stage, more amount of data may need to be logged, e.g., as more data may be necessary to analyze the product and make any necessary changes to stabilize the behavior of the product, and as the product matures less amount of data may be needed, e.g., as the product is believed to be more stable. Further, as the product matures, the number of users using the product can be significantly large. However, the current data-logging techniques continue to log the data in the same way throughout the lifecycle of the product, which can generate significant volumes of data, thereby consuming the computing resources of the user's device.

DETAILED DESCRIPTION

Figure 1A:
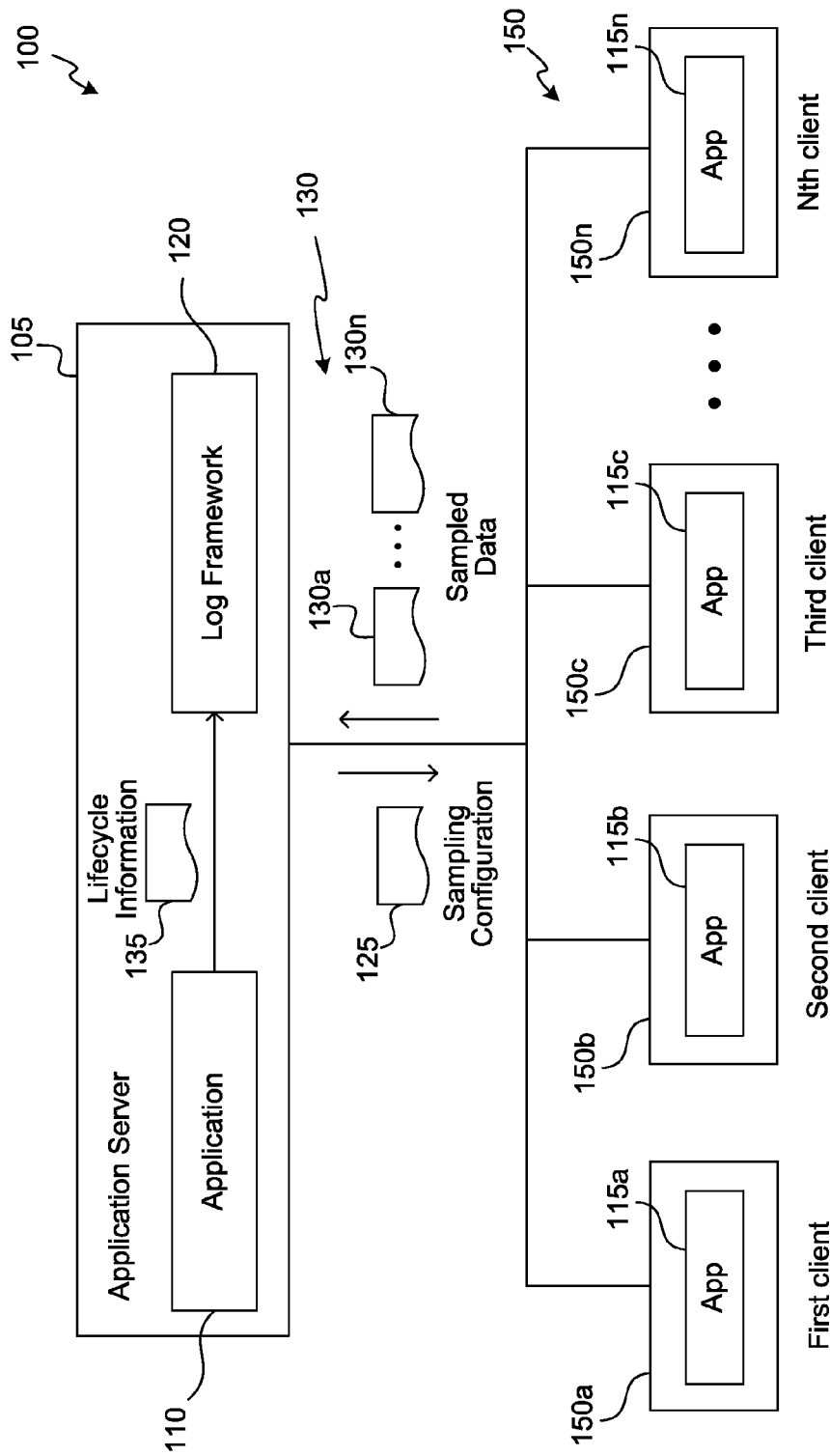
FIG. 1A is a block diagram of an environment in which a log framework can be implemented.

Disclosed are embodiments for a log framework that enables controlling of data sampling at client devices based on a lifecycle of a product. The product can be an application ("app"), e.g., a social networking application, or a feature of the app executing on a client computing device ("client") associated with a user. In some embodiments, the client can be a mobile device, e.g., a laptop, a smartphone, a tablet personal computer (PC), or a wearable device. The application can sample data related to various aspects of the application, e.g., events that occur in the application. The events can include user interactions, e.g., viewing a news feed in the social networking application, uploading an image, posting a message, commenting on a post, playing a game, messaging another user. The application can generate a log file containing the sampled data and transmit the sampled data to a server computing device ("server"), e.g., on which a server portion of the application is executing.

The application samples the data based on specified criteria, e.g., specified events, specified actions of a user of the client device, at a specified sampling rate. The log framework enables controlling the sampling rate of data based on a lifecycle of the product. The lifecycle of the product indicates various stages the product can go through, e.g., since the inception of the product until the product is mature or is sunset. The product can be at various stages of lifecycle, e.g., an experiment stage, a product launch stage, and a mature stage. In some embodiments, the experiment stage is a stage where the product is being experimented in a closed group of candidate users before the product is publicly launched, e.g., made available to a large group of users. The closed group can be within an organization or external to the organization. In some embodiments, the product launch stage is a stage where the product is made available to a limited number of users, e.g., more number of users than the users during the experimental phase but less than the number of users when the product is in the mature stage. Further, in some embodiments, the number of users to whom the product is made available during the product launch stage can be increased progressively over a specified duration. In some embodiments, the mature stage can be a stage where the product is considered to be stable, e.g., number of errors or bugs in the product is below a specified threshold. During the mature stage, the product is made available publicly, across a large number of users.

The log framework can be used to configure various parameters of the sampling, including a number of users to be sampled, a set of events to be sampled, a sampling rate for the events, etc., based on the lifecycle of the product. An amount of data logged by the clients can vary over the lifecycle of the product. For example, the number of users using the product can be less for an initial phase of a product launch stage, increase sharply as time progresses, and be significantly large by the time the product reaches a mature stage and with that the amount of data logged may be significantly large. The data obtained from the initial phase of the product launch can be used to monitor the behavior of the product and make any necessary changes to the product. As time progresses, the behavior of the product may stabilize and the amount of log data needed for monitoring the application may be decreased. Accordingly, the data logged in later phases of the product launch can be decreased, thereby saving computing resources, e.g., processor, battery, storage, networking, at either or both the mobile device of the user and the server processing the log data. So, the log framework can sample at a higher rate (and/or sample all of the users) in the initial phase of the product launch, e.g., when the number of users is less, and gradually decrease the sampling rate (and/or number of users that are sampled) as time progresses, e.g., as the number of users increase during later phases of the product launch stage. The sampling rate can either be set manually, e.g., by a user associated with the product, or be adjusted automatically by the log framework based on some input, e.g., duration of the product launch, received from the product.

In the experiment stage of the lifecycle of the product, data may need to be logged during the entire phase of the experimentation, e.g., to analyze the behavior of the product and make any necessary changes to improve the efficiency or correct any errors. Further, the type of data that need to be logged in the experiment stage can be different from the data that is logged during product launch, e.g., more detailed than that logged during the product launch phase. After the experiment stage completes, the logging of data may be terminated, thereby preventing consumption of computing resources, e.g., processor, battery, storage, networking, at either or both the mobile device of the user and the server processing the log data, for logging data that may not be consumed anymore. So, the log framework can set a sampling rate and terminate the sampling after an expiration date of the experiment. The log framework can be configured to sample some or all of the users during the experiment stage. In some embodiments, the log framework is configured to sample all of the users during the experiment stage, e.g., as more data may be required to analyze the behavior product. The sampling rate can either be set manually, e.g., by a user associated with the product, or be adjusted automatically by the log framework based on some input received from the product.

The log framework can generate a sampling configuration that includes data sampling criteria to be used by the app executing on the client for sampling the data. The sampling criteria can include a list of events occurring in the app to be sampled, a list of actions of a user of the client, a sampling rate of an event, etc. Using the sampling configuration, the server can control the data sampling performed at the client. The log framework enables controlling the sampling of data from the server, thereby eliminating the need to modify the code of app when the sampling criteria are modified.

After the sampling configuration is generated, the server transmits the sampling configuration file to one or more clients, which perform the sampling based on the sampling configuration. The sampling configuration can be transmitted to all the users, some of the users or a single user of the application. The users can be selected for sampling based on various criteria, e.g., randomly. After the users are determined, the server can transmit the sampling configuration to the client devices of the selected users.

The log framework provides the flexibility to sample different events at different sampling rates, e.g., by assigning weights to the events. Events with similar weights are sampled at similar rates. In some embodiments, the sampling rate of an event can be revised based on the sampled data received for the event. For example, the server can generate a confidence interval from the sampling data received for an event and determine whether to adjust the sampling rate of the event based on the received sampled data. The confidence interval of a particular data item can be used as an input for determining or adjusting the sampling rate of an event associated with the data item.

In some embodiments, events are categorized into multiple hierarchies and their sampling rates are determined based on the hierarchy. For example, a first hierarchy can include events that occur more often than a specified threshold and a second hierarchy can include events that occur less often than the specified threshold. Further, the events in the first hierarchy, that is, events that occur more often than the specified threshold can be sampled at a rate lower than the events in the second hierarchy, that is, events that occur less often than the specified threshold.

In some embodiments, an event can be a composite event, which can be viewed as a collection of related events. That is, when a composite event occurs, the related events can also occur. For example, in a social networking application, sharing of a photo album by a user can be a composite event, which can be a collection of related events such as creating a photo album, uploading pictures to the photo album, tagging users in the pictures, face recognition of the people in the picture, identifying a set of users to share the album with, sharing the album, etc. The events in the composite event can occur independent of the composite event and/or when the composite event occurs. For example, tagging a user in the picture can occur when the user shares the album with other users or also can occur independently, e.g., tagging a person in an image uploaded by another user. In some embodiments, the individual sampling weights of the related events can be different from a sampling weight of the composite event, in which case the sampling weights of the related events can be adjusted so that the related events are sampled when the composite event is sampled.

The log framework can also assign a priority to the events, and can instruct the clients to send the sampled data to the server at based on a priority of the events. For example, the log framework can instruct a client to send the sampled data of a high priority event substantially immediately after the data is logged by the client. A user, e.g., an administrator associated with the application, the server and/or the framework can define what substantially immediately is. In some embodiments, substantially immediately is within a specified duration, e.g., one or more seconds or a few minutes, after the data related to the event is logged. In some embodiments, substantially immediately is as soon as a connectivity is established, e.g., Internet connection, between the client and the server after the data related to the event is logged. In another example, the log framework can instruct a client to send the sampled data of a low priority event at a time that is determined as a function of available computing resources at the client, e.g., memory, battery, processing capacity, bandwidth of connection between the client and the server. For example, the log framework can instruct the client to transmit the sampled data after the sampled data reaches a specified amount, e.g., a few kilobytes, or when the life of a battery of the client is above a specified percentage. By controlling the sampling of data at the clients from the server, the log framework can eliminate the need for changing the code of the app at the client when the sampling criteria is changed or the need for a user of the client to change the log settings when the sampling criteria is to be changed.

Turning now to the figures, FIG. 1A is a block diagram of an environment in which the log framework can be implemented. The environment 100 includes a server, e.g., server 105, that can be used to implement a product, e.g., an application or a feature in the application, which can be accessed by a number of users using associated client computing devices, e.g., clients 150a-n ("clients 150"). In some embodiments the application is a social networking application. The server 105 can execute a server portion of the application, e.g., application 110, and the clients 150 can execute a client portion of the application, e.g., app 115. For example, a first client 150a, which is associated with a first user, can execute the client portion of the application, e.g., app 115a. The first user can download the app 115a, e.g., from a source specified by the server 105, and install the app 115a at the first client 150a.

A client can be a desktop, a laptop, a smartphone, a tablet PC, a wearable device, a computing device integrated within an automobile or any other computing device that is able to execute the app 115. The app 115 can be implemented in various configurations. For example, the app 115 can be a desktop version of a social networking application or a mobile version of the social networking application. In some embodiments, the users can access the desktop version of the social networking application via a web browser.

During the usage of the app 115 by the users, e.g., app 115a by the first user at the first client 150a, various events can occur. In some embodiments, the events can be user interactions or can result from a user interaction. For example, in a social networking application, an event can include loading a news feed, uploading an image, posting a message, commenting on a post, playing a game, messaging another user, sending a friend request, performing a search for other friends, visiting a friend's timeline, etc. The server 105 can collect data associated with such events, e.g., for analyzing the performance of the application 110 and/or app 115, improving the performance of the application 110/app 115, etc. The environment 100 includes a log framework 120 that can facilitate sampling such data at the clients 150. The log framework 120 can be implemented in the server 105 or as a separate server that works in association with the server 105. Additionally or alternatively, the log framework 120 can be implemented as a distributed application over a number of servers.

The log framework 120 facilitates the server 105 to control the sampling of data at the clients based on sampling criteria. For example, the log framework 120 can facilitate the server 105 to control the sampling for "x" number of users. In some embodiments, the number "x" can be determined by the server 105 or input by a user, e.g., the administrator associated with the log framework 120, server 105 or the application 110. For example, the number "x" can be a specified percentage of total number of users of the app 115. After the number "x" is determined, the server 105 can identify the set of "x" users based on various criteria, e.g., randomly. In another example, the log framework 120 facilitates the server 105 to specify a set of events occurring at a client, e.g., first client 150a, that have to be sampled. In another example, the log framework 120 facilitates the server 105 to specify a sampling rate of an event, that is, a rate at which the events have to be sampled. For example, the sampling rate of an event can be "10%", which can mean that "10" out of "100" occurrences of the event is sampled and data associated with these "10" events is logged, e.g., in a log file.

The log framework 120 generates a sampling configuration file, e.g., sampling configuration 125, that contains the sampling criteria and transmits the sampling configuration 125 to the determined number of users, e.g., all or some of the users. The app 115 at the clients 150 generate samples the data per the sampling configuration 125 and generates sampled data, e.g., sampled data 130. The clients 150 transmit the sampled data 130 to the server 105. In some embodiments, different clients can sample different events. For example, the sampling configuration file sent to the first client 150a can be different from the sampling configuration file sent to the second client 150b. Further, different clients can transmit the sampled data to the server 105 at different times, e.g., based on a priority of the events sampled and/or available computing resources at a specified client.

In some embodiments, the log framework 120 can also facilitate revising the sampling criteria for a user or a set of users based on the received sampled data. For example, if the amount of sampled data received from a specified user for a specified event is insufficient, the sampling rate for the event can be increased. Similarly, if the amount of sampled data exceeds a specified threshold, the sampling rate for the event can be decreased. The sampling rate can be adjusted automatically, e.g., by the server 105, or manually by a user, e.g., the administrator. After the sampling rate is adjusted, the log framework 120 can generate a revised sampling configuration file and send it to client associated with the specified user.

Figure 1B:
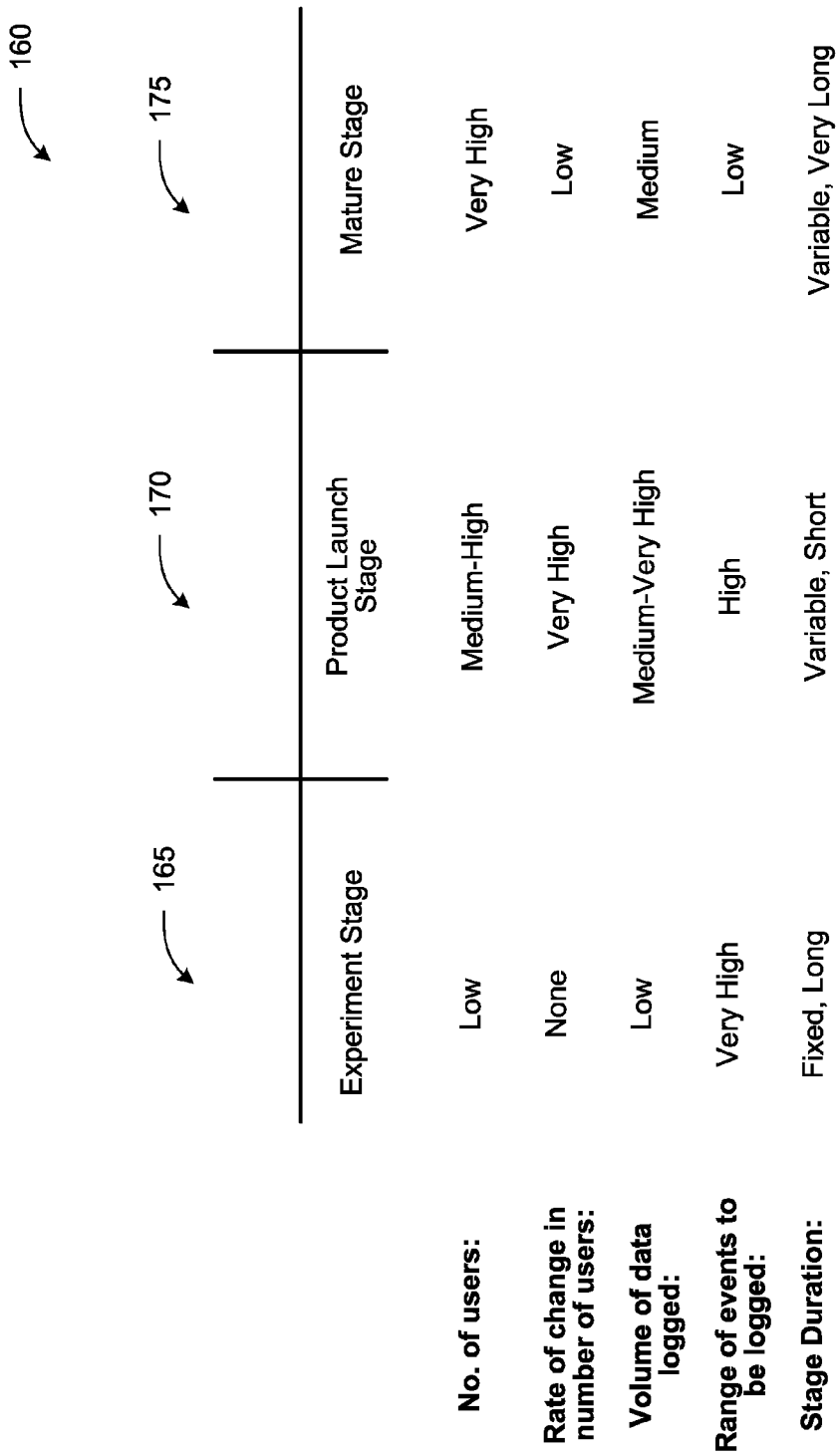
FIG. 1B is a block diagram of an example illustrating various stages of a lifecycle of a product, consistent with various embodiments.

In some embodiments, the log framework 120 also facilitates controlling and/or revising the sampling rate of the data by the app 115 based on a lifecycle of the app 115. FIG. 1B is a block diagram of an example 160 illustrating various stages of a lifecycle of a product, consistent with various embodiments. The lifecycle of the app 115 indicates various stages the app 115 can go through. For example, the app 115 can be at an experiment stage 165, a product launch stage 170, and a mature stage 175. Each of the lifecycle stages has a different set of characteristics. The log framework 120 can be used to configure the sampling rate for the events based on the lifecycle stage of the app 115.

In some embodiments, the various parameters of a lifecycle stage of the app 115 includes a number of users using the app 115 in a specified stage, a rate of change of the number of users within the specified stage, volume of data logged in the specified stage, a range of events sampled in the specified stage and a duration of the specified stage. Different parameters can have different values. For example, the number of users, volume of data logged and the range of events sampled can have values ranging from low to very high, e.g., "low," "medium," "high," and "very high." In another example, the rate of change of the number of users can have values "none," "low," "medium," "high," and "very high." In another example, the stage duration can have values indicating the length of the duration, e.g., "short," "medium," "long," and "very long." The stage duration can also have a second value indicating whether the duration is variable or fixed. The range of actual values that fall into any of the above values "low," "medium," "high," and "very high," etc., are configurable. In some embodiments, the administrator defines the ranges of actual values of the parameters. For example, for the number of users parameter, "low" can be defined as "1-100" users, "medium" as "101-10000" users, "high" as "10001-1,000,000" users and "very high" as "1,000,001" users and above. The actual value ranges for other parameters can be defined similarly.

In an experiment stage 165 of the lifecycle of the app 115, data may need to be logged during the entire phase of the experimentation, e.g., to analyze the behavior of the app 115 and make any necessary changes to improve the efficiency or correct any errors. Also, data may be logged for all the users since the number of users can be relatively less in the experiment stage 165. Further, the experiment stage 165 typically occurs for a fixed duration. After the experiment stage 165 is completed, the logging of data may be terminated by the log framework 120, thereby preventing consumption of computing resources, e.g., processor, battery, storage, networking, at the clients 150, for logging data that may not be consumed anymore. So, the log framework 120 provides a flexibility to control the sampling rate, e.g., terminate the sampling, of the data for the app 115 based on the lifecycle of the app 115.

In another example, in a product launch stage 170 of the app 115, the number of users using the app 115 can be less for an initial phase, then increase sharply as time progresses, and be significantly large by the time the app 115 reaches a mature stage 175. In some embodiments, the administrator defines the product launch duration. The data sampled during the product launch stage 170 can be used to monitor, analyze, fix any errors and/or improve the efficiency of the app 115. The amount of data logged during the product launch stage 170 increases with time. As time progresses, the behavior of the app 115 may stabilize and the volume of log data needed for monitoring the app 115 can decrease. Accordingly, the volume of data logged in later phases of the product launch stage 170 can be decreased, e.g., by decreasing the sampling rate of the events. That is, the log framework 120 can adjust the sampling rate based on the parameters of the lifecycle, e.g., decrease the sampling rate if the number of users and/or volume of data being sampled increases or increase the sampling rate if the number of users and/or volume of data being sampled decreases. The log framework 120 provides a flexibility to control the sampling rate of the data for the app 115 based on the lifecycle of the app 115.

After the completion of the product launch stage 170, e.g., completion of duration of the product launch stage 170, the app 115 can enter the mature stage 175, and the volume of data to be logged can be decreased, e.g., since the behavior of the app 115 is considered to be significantly stable. If the sampling rate is not decreased, the amount of data logged can be significant since the number of users using the app 115 during the mature stage 175 is typically very high. The log framework 120 automatically adjusts the sampling rate, e.g., decreases, when the app 115 progresses from the product launch stage 170 to the mature stage 175. Further, the range of events that are sampled in the mature stage 175 can also be decreased from that of the product launch stage 170 since the product is considered to be stable. In some embodiments, the log framework 120 can be configured to sample only high priority events, e.g., events that can cause the app 115 to fail, during the mature stage 175. However, the administrator can override or customize the events to be sampled. In some embodiments, the events can include a tag that identifies the lifecycle stage during which the event is to be sampled. For example, a tag "EV_exp" indicates an event that has to be sampled during the experiment stage 165. In another example, a tag "EV_pl" indicates an event that has to be sampled during the product launch stage 170. In another example, a tag "EV_ms" indicates an event that has to be sampled during the mature stage 175. An event can have one or more tags.

In some embodiments, the log framework 120 obtains lifecycle information 135 from the application 110. For example, the administrator may include lifecycle information 135 of the app 115 in metadata of the application 110. In another example, the lifecycle stage of the app 115 can be of "custom" stage. In the custom stage, the app 115 can be any of the lifecycle stages 165-175. However, the application 110 may not provide the exact lifecycle information to the log framework. The log framework 120 can analyze a data traffic pattern of the app 115, e.g., whether the number of users using the app is changing or constant over a period, amount of data being logged, to determine the lifecycle of the app. The log framework 120 can control the sampling rate of the data for the app 115 based on the determined lifecycle of the app 115.

It should be noted that although only three stages are depicted in the example 160, the lifecycle of the app 115 can have more number of stages. Further, although the lifecycle stages 165-175 are illustrated in a specified order in the example 160, the app 115 may not proceed through the stages in the specified order. For example, the app 115 may not progress from the product launch stage 170 to the mature stage 175 if the administrator decides to extend the duration of the product launch stage 170 and/or put the app 115 back into the experiment stage 165. The log framework 120 can continuously and automatically revise the sampling rate based on the lifecycle of the app 115. Additional details with respect to generating and transmitting the revised sampling configuration file are described at least in association with FIGS. 6-9. Additional details with respect to controlling the sampling rate based on the lifecycle information are described at least in association with FIGS. 10-13.

Figure 2:
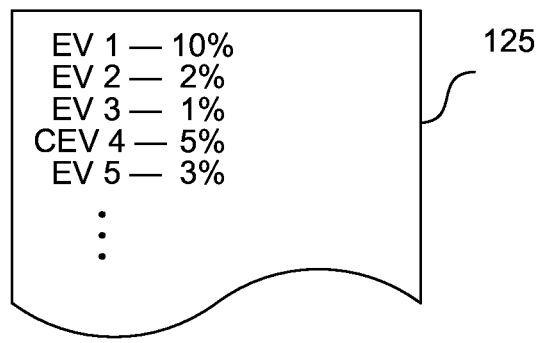
FIG. 2 is a block diagram of an example of sampling configuration file of FIG. 1A, consistent with various embodiments.

FIG. 2 is a block diagram of an example of the sampling configuration file of FIG. 1A, consistent with various embodiments. The sampling configuration 125 can include information that may be used by the clients 150 for sampling the data. The sampling configuration 125 can include a list of events, e.g., a first event "EV 1", a second event "EV 2" and so on. The sampling configuration 125 can include the sampling rates of the events. For example, the sampling rate of the first event is "10%," which can mean that "10" out of "100" occurrences of the first event have to be sampled by a client.

Note that FIG. 2 illustrates the sampling configuration 125 as including only the list of events and their sampling rates. However, the information included in the sampling configuration 125 is not limited to the above; the sampling configuration 125 can include other information. In some embodiments, the sampling configuration 125 can include a sampling weight of the event that can be used by the client to determine the sampling rate of the event. The weight can be included in addition to or instead of the sampling rate. The sampling configuration 125 can also include other information, e.g., date and time the sampling configuration 125 was generated at the server 105, a checksum of the sampling configuration 125. It should be noted that the format of the information included in the sampling configuration 125 as illustrated in FIG. 2 is just an example. The sampling configuration 125 can include the information in various other formats based on, e.g., a type of the client device, amount of storage space consumed by the sampling configuration 125, amount of computing resources required to process the sampling configuration 125. In some embodiments, the sampling configuration 125 can be encrypted and/or encoded before being transmitted to the clients 150, which is decrypted and/or decoded by the clients 150 before the data is sampled.

Figure 3:
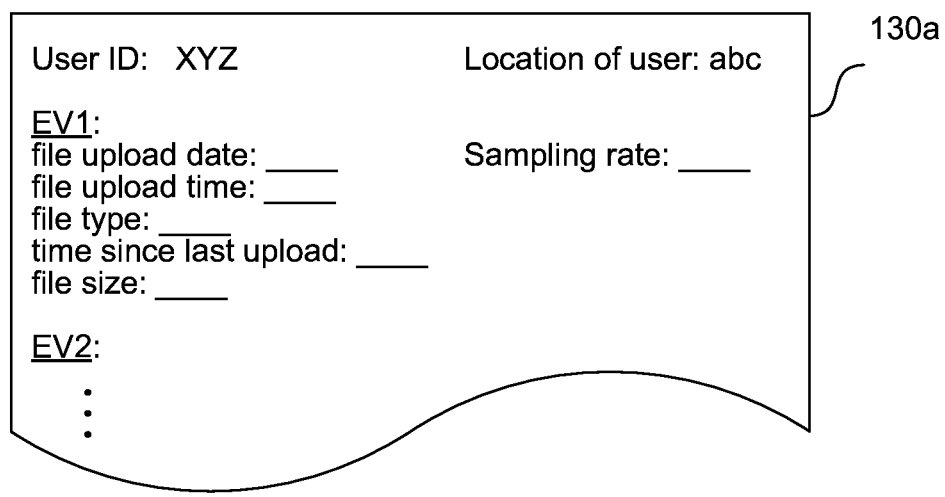
FIG. 3 is a block diagram of an example of sampled data of FIG. 1A, consistent with various embodiments.

FIG. 3 is a block diagram of an example of sampled data of FIG. 1, consistent with various embodiments. The sampled data 130 generated by the clients 150 can include various information pertaining to the events occurring at the clients 150. For example, the sampled data 130a, can include information pertaining to the events occurring in the first client 150a associated with the first user. The sampled data 130a includes the data that is sampled as per the latest sampling configuration, e.g., sampling configuration 125, received from the server 105. The sampled data 130a includes other information for each of the events sampled. For example, for an event such as sharing a multimedia item with other users in the social networking application, the information logged/sampled can include an event ID, a file upload date and time, a type of file uploaded (e.g., audio, video, image) a size of the file uploaded, time elapsed since the previous upload, etc.

The sampled data 130a can also include various other information pertaining to the first user and/or the first client 150a, e.g., a user identification (ID) of the first user, a location of the first user, date and time the sampled data 130a was last updated, a type of the first client 150a, a type of connection (e.g., Wi-Fi, cellular internet) used to upload the image.

In some embodiments, the sampled data 130a also includes the sampling rates of the events sampled, which can be provided by the sampling configuration 125. In some embodiments, the sampling rates can be determined using the information, e.g., a weight of an event, provided by the sampling configuration 125. In some embodiments, the sampled data 130a also includes the checksum of the sampling configuration, e.g., sampling configuration 125, according to which the sampled data 130a is generated, which can be used by the log framework 120 to determine if the first client 150a has the latest sampling configuration generated for the first client 150a. The sampled data 130a can be encoded and/or encrypted before being transmitted to the server 105.

It should be noted that the information and the format of the information included in the sampled data 130a as illustrated in FIG. 3 is just an example. The sampled data 130a can include various other information, e.g., as defined by the application 110, and also in various other formats.

Figure 4:
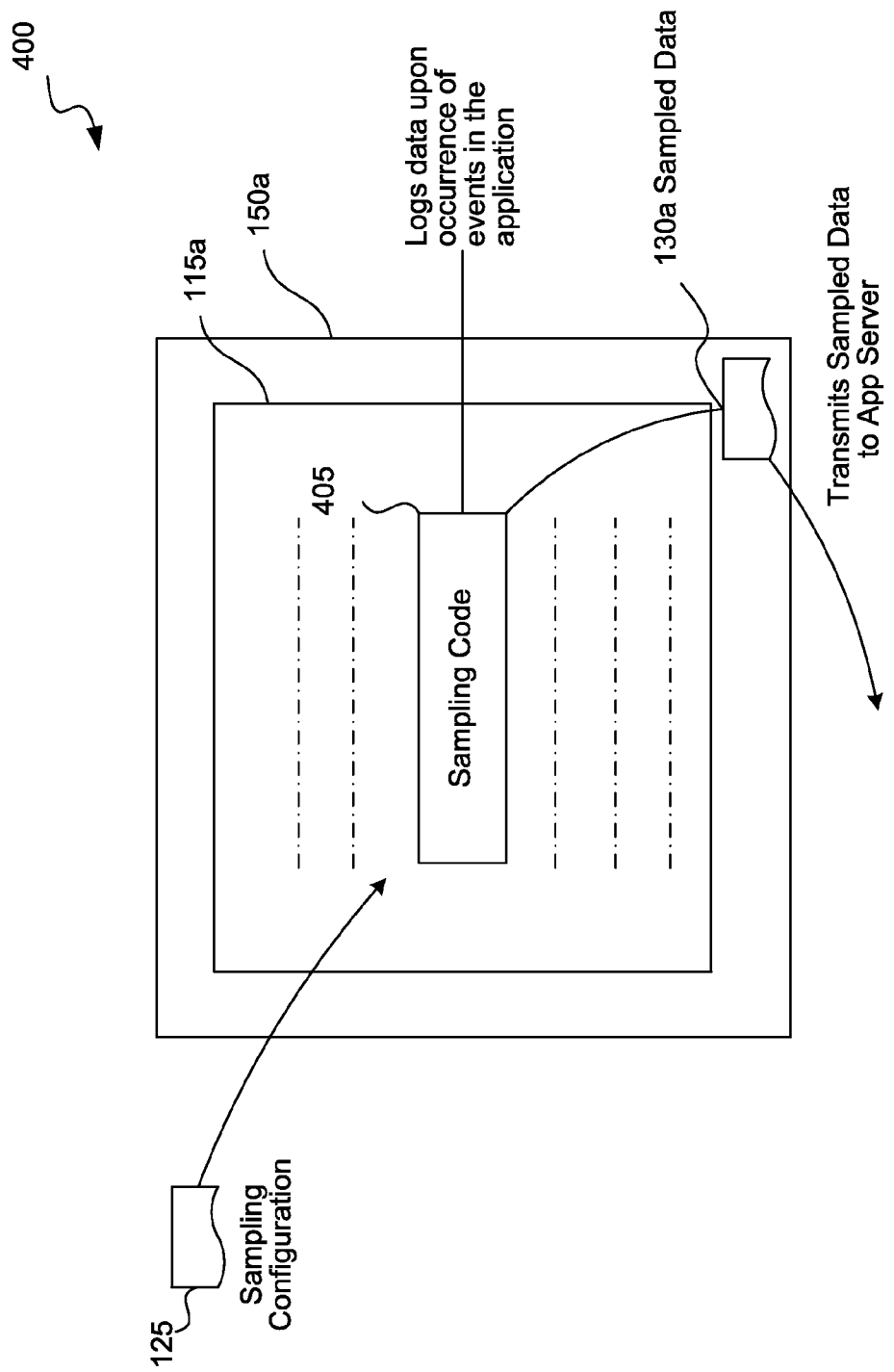
FIG. 4 is a block diagram illustrating an example of sampling of data at a client using the sampling configuration of FIG. 1A, consistent with various embodiments.

FIG. 4 is a block diagram illustrating an example 400 of sampling of data at a client using the sampling configuration of FIG. 1, consistent with various embodiments. The example 400 illustrates sampling of data of the first user associated with the first client 150a. When the first client 150a receives a sampling configuration, e.g., sampling configuration 125 from the server 105, the app 115a processes the sampling configuration 125 to sample the data of the first user, e.g., the events occurring on the first client 150a, accordingly. The app 115a includes the code for instrumentation, e.g., sampling code 405. In some embodiments, the sampling code 405 is included as part of the development of the app 115a and is configured to log the necessary data, e.g., as defined by the app 115. The sampling configuration 125 can be used to instruct the sampling code 405 to turn on or turn off the logging of specified data and/or change the sampling rate of the specified data.

The sampling code 405 processes the sampling configuration 125 to determine the events to be sampled and their sampling rates. The sampling code 405 monitors the app 115a for the occurrence of the specified events, samples the events per the sampling configuration 125 and generates the sampled data in a log file, e.g., sampled data 130a. In some embodiments, the sampled data 130a can include the information as illustrated in FIG. 3. The sampled data 130a is then transmitted to the server 105.

The instance at which the sampled data 130a is to be transmitted to the server 105 can be determined based on various factors, e.g., as a function of available computing resources of the first client 150a, a size of the sampled data 130a, priority of the events that are sampled. For example, the log framework 120 can instruct the first client 150a to send the sampled data 130a of a high priority event substantially immediately after the data is logged by the first client 150a, e.g., within a specified duration from the time the data related to the event is logged, as soon as a connectivity between the client and the server is established, e.g., Internet connection, after the data related to the event is logged.

In another example, the log framework 120 can instruct the first client 150a to send the sampled data 130a of a low priority event at a time that is determined as a function of available computing resources at the client, e.g., memory, battery, processing capacity, bandwidth of connection between the client and the server. For example, the log framework 120 can instruct the client to transmit the sampled data after the sampled data reaches a specified amount, or when the life of a battery of the client is above a specified percentage.

Various techniques can be used to minimize the consumption of resources of the first client 150a in generating the sampled data 130a. For example, the sampled data 130a can be encoded to minimize the storage space and bandwidth consumed by the sampled data 130a.

Figure 5:
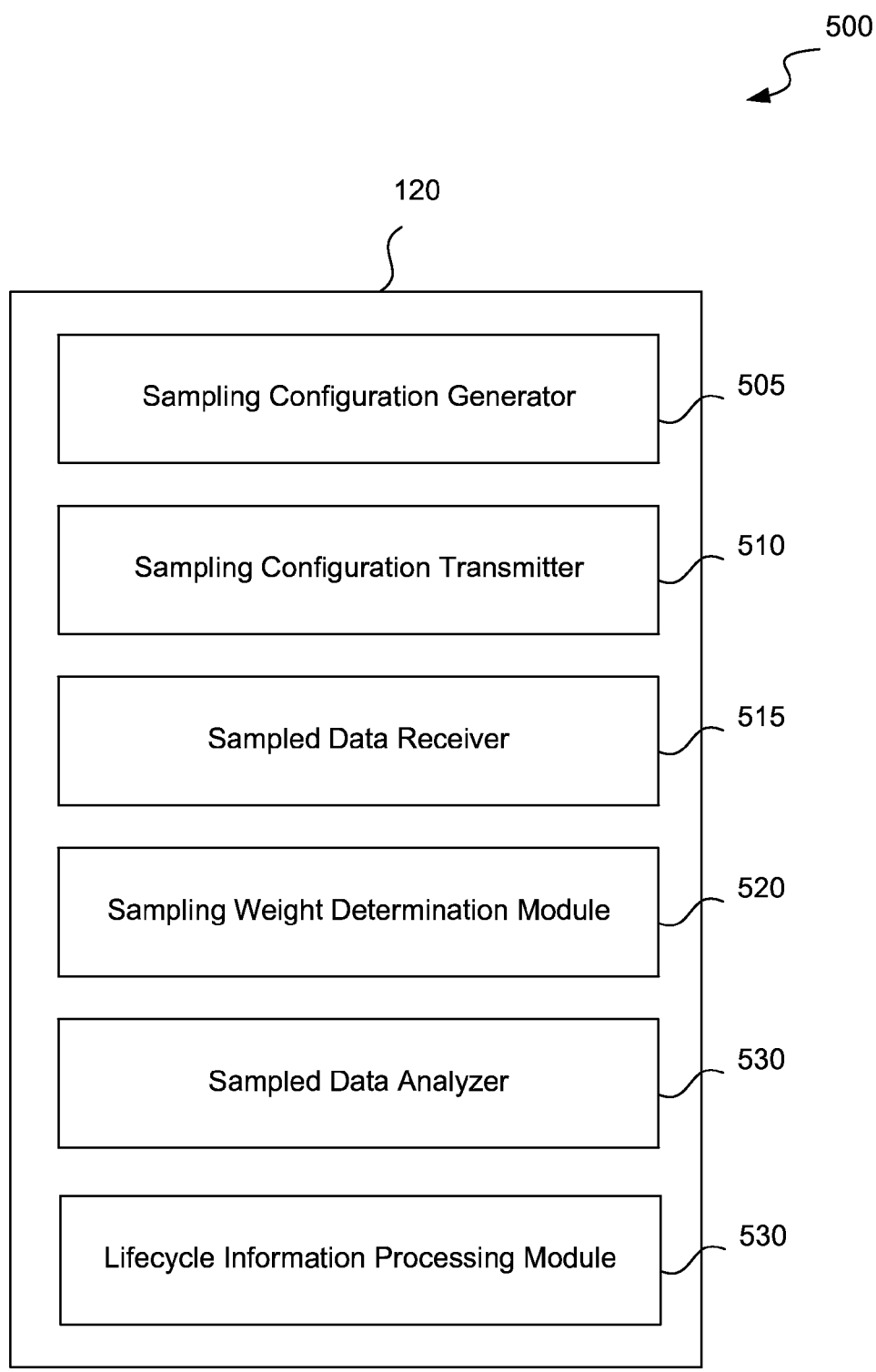
FIG. 5 is a block diagram of the log framework of FIG. 1A, consistent with various embodiments.

FIG. 5 is a block diagram of the log framework of FIG. 1, consistent with various embodiments. The log framework 120 includes a sampling configuration generator 505 that can be configured to generate a sampling configuration, e.g., sampling configuration 125, that can be used to control data sampling at clients, e.g., clients 150. The log framework 120 includes a sampling configuration transmitter 510 that can be configured to transmit the sampling configuration generated by the sampling configuration generator 505 to one or more of the clients 150. The sampling configuration transmitter 510 can also be configured to encode and/or encrypt the sampling configuration before being transmitted to the clients 150. In some embodiments, the sampling configuration transmitter 510 can also include the logic to determine the set of users of the application 110 to whom the sampling configuration has to be transmitted. After the set of users are determined, the sampling configuration transmitter 510 transmits the sampling configuration to the clients associated with the set of users.

The log framework 120 includes a sampled data receiver 515 that is configured to receive the sampled data, e.g., sampled data 130, from one or more of the clients 150. The sampled data receiver 515 can also be configured to decode and/or decrypt the sampled data if encoded and/or encrypted by the clients 150. The log framework 120 includes a sampling weight determination module 520 that is configured to assign sampling weights to the events that need to be sampled by the clients 150. In some embodiments, a user, e.g., an administrator associated with the application 110, the log framework 120 and/or the server 105 can program the sampling weight determination module 520 to assign sampling weights to the events. In some embodiments, the sampling weight determination module 520 can automatically adjust the sampling weights as a function of various factors, e.g., sampling weights of other related events.

The log framework 120 includes a sampled data analyzer 530 that can be configured to analyze the sampled data received from the clients 150. For example, the sampled data analyzer 530 can analyze the sampled data to generate a confidence interval for a specified event. The confidence interval can then be used to adjust the sampling rate for the specified event.

The log framework 120 includes a lifecycle information processing module 535 that can be configured to obtain lifecycle information of a product, e.g., lifecycle information 135 of app 115. In some embodiments, the lifecycle information processing module 535 retrieves the lifecycle information from metadata of the product, e.g., from metadata of application 110. In some embodiments, the lifecycle information processing module 535 determines the lifecycle information of the product by analyzing the data traffic pattern associated with the app 115. Additional details with respect to the modules of the log framework 120 are described at least with reference to FIGS. 6-13 below.

Note that the log framework 120 illustrated in FIG. 5 includes a specified number of modules. However, the number of modules is not restricted to the above modules. The log framework 120 can include lesser number of modules, e.g., functionalities of two modules can be combined into one module, or can include more number of modules, e.g., modules that perform other functionalities. In some embodiments, the functionalities of one or more of the above modules can be split into two or more modules. Furthermore, the log framework 120 can be implemented in the server 105 or as a separate standalone server that works in co-operation with the server 105.

Figure 6:
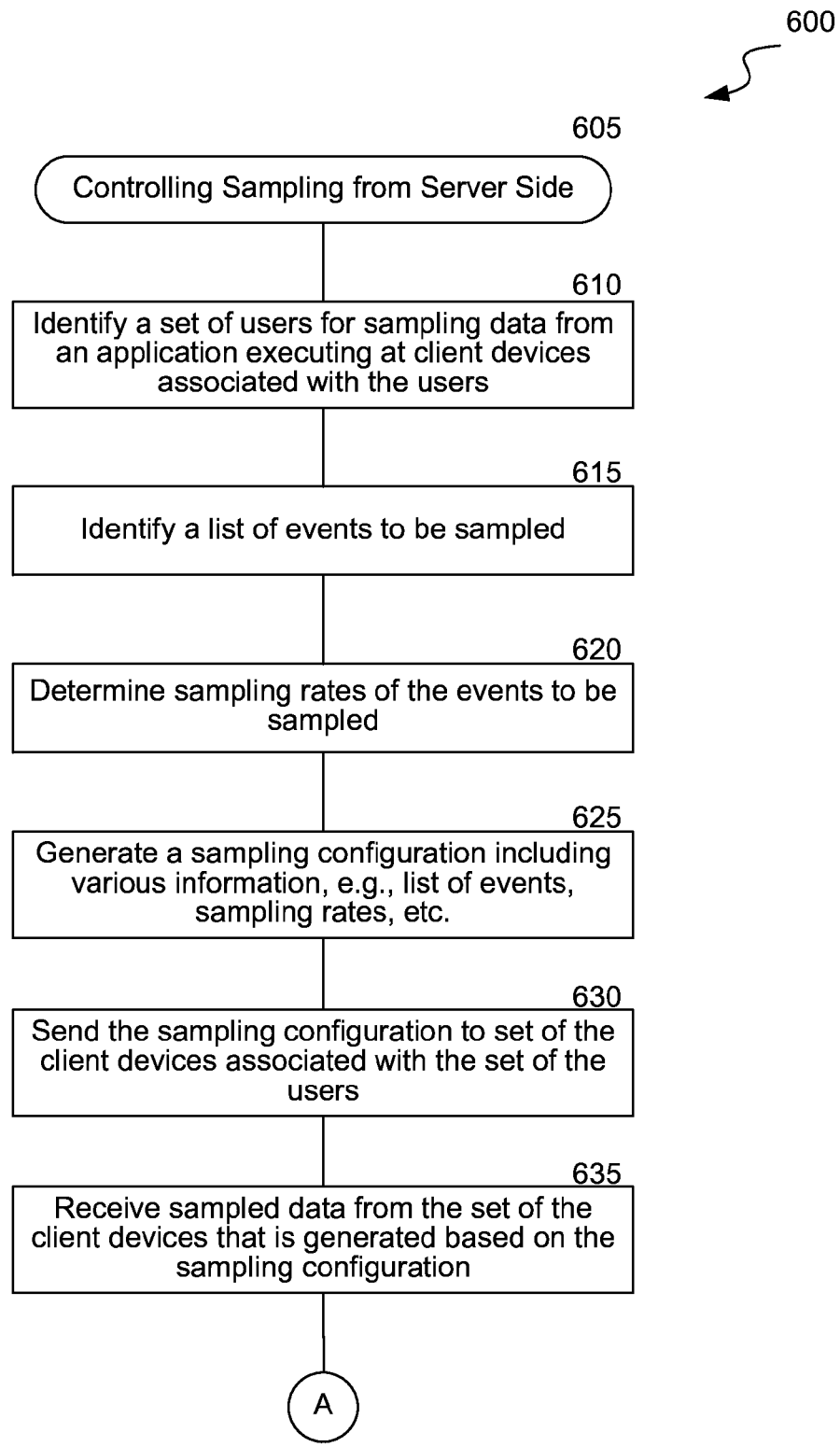
FIG. 6 is a flow diagram of a process of controlling sampling of data at client devices from a server, consistent with various embodiments.

FIG. 6 is a flow diagram of a process 600 of controlling sampling of data at client devices from a server, consistent with various embodiments. The process 600 may be executed in the environment 100 of FIG. 1A. The process 600 begins at block 605, and at block 610, the sampling configuration transmitter 510 of log framework 120 identifies a number of users "x" to sample data from.

The sampling configuration transmitter 510 determines the number of users, "x" based on various factors, e.g., total number of users for the application, amount of sampled data requested by the application 110, number of users who can potentially cause the events to occur, actual amount of sampled data received. In some embodiments, the sampling configuration transmitter 510 can receive the number of users from a user, e.g., the administrator. In some embodiments, the sampling configuration transmitter 510 determines the number of users based on analysis of the previously received sampled data. For example, if the sampled data analyzer 530 determines that the amount of sampled data received exceeds a specified threshold, the sampling configuration transmitter 510 can decrease the number of users from whom the data is to be sampled. After the number of users is determined, the sampling configuration transmitter 510 determines a set of "x" users to whom the sampling configuration is to be transmitted. In some embodiments, the sampling configuration transmitter 510 selects the set of "x" users randomly, pseudo randomly or as specified by the administrator. In some embodiments, pseudo random selection can include selecting subsets of "x" users located at different geographies, of different age profiles, gender profiles, etc.

At block 615, the sampling configuration generator 505 identifies the list of events to be sampled. In some embodiments, the sampling configuration generator 505 can receive the list of events from the administrator.

At block 620, the sampling configuration generator 505 determines the sampling rates of the events to be sampled. The sampling rates can be determined in various ways. In some embodiments, a sampling rate of an event is determined as a function of a weight associated with the event. In some embodiments, the sampling configuration generator 505 can receive the sampling rate from the administrator. In some embodiments, the sampling configuration generator 505 can adjust the sampling rate of the event as a function of a sampling rate of another related event.

At block 625, the sampling configuration generator 505 generates a sampling configuration file, e.g., sampling configuration 125, including various information, e.g., the list of events determined in block 615, sampling rates determined in block 620, etc.

At block 630, the sampling configuration transmitter 510 sends the sampling configuration to a set of the client devices associated with the set of the users, e.g., determined in block 610. In some embodiments, the sampling configuration transmitter 510 can encrypt and/or encode the sampling configuration prior to transmission of the sampling configuration.

At block 635, the sampled data receiver 515 receives the sampled data from the set of the client devices. The clients generate the sampled data based on the sampling configuration transmitted to them, e.g., as described in block 630.

At block 640, the sampling configuration generator 505 can generate a revised sampling configuration to control the sampling of the data at one or more of the client devices, e.g., based on the received sampled data. The sampling configuration can be revised for various reasons, e.g., to adjust number of users, sampling rates of the events, modify the list of events to be sampled. For example, if the amount of sampled data received from the clients exceeds a specified threshold, the number of users who are sampled can be decreased. In another example, if the amount of sampled data for a specified event exceeds a specified threshold, the number of users who are sampled can be decreased. After the revised sampling configuration is generated, it is sent to one or more of the clients. Additional details with respect to sending the revised sampling configuration is described in association with FIG. 7.

Figure 7:
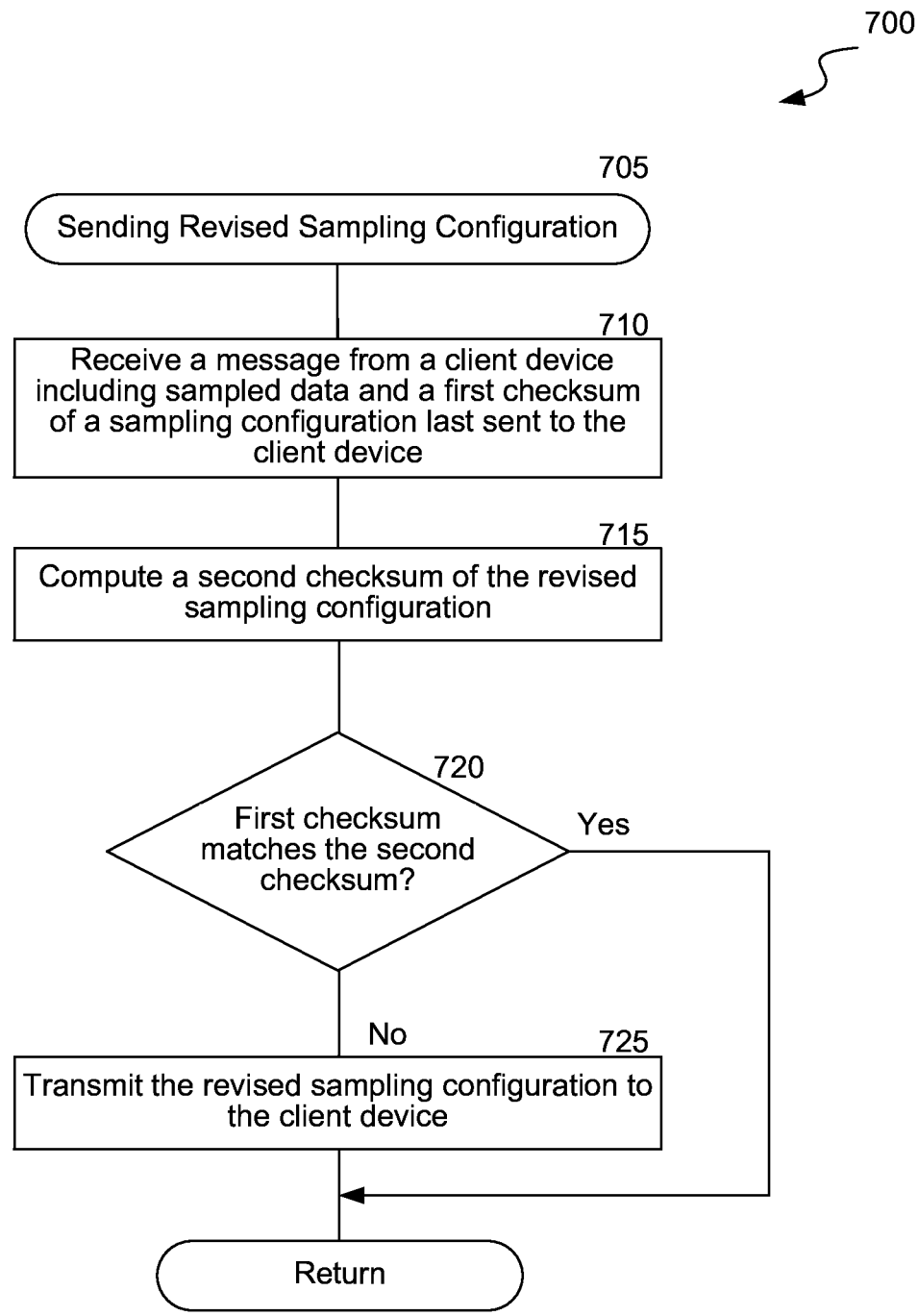
FIG. 7 is a flow diagram of a process of sending a revised sampling configuration to the client devices, consistent with various embodiments.

FIG. 7 is a flow diagram of a process 700 of sending a revised sampling configuration to the client devices, consistent with various embodiments. The process 700 may be executed in the environment 100 of FIG. 1A. The process 700 begins at block 705, and at block 710, the sampled data receiver 515 receives a message from a client device. The message can include the sampled data generated by the client and a checksum of the sampling configuration using which the client generated the sampled data. In some embodiments, a checksum is an error-detection scheme in which each transmitted message is accompanied by a numerical value based on the number of set bits in the message. The receiving station then applies the same formula to the message and checks to make sure the accompanying numerical value is the same. If not, the receiver can assume that the message has been garbled. The checksum can be computed in various known methods.

At block 715, the sampling configuration transmitter 510 computes a checksum of the revised sampling configuration, e.g., generated as described in block 640 of FIG. 6.

At determination block 720, the sampling configuration transmitter 510 determines whether the checksum of the revised sampling configuration matches the checksum in the message received from the client. If the checksums do not match, at block 725, the sampling configuration transmitter 510 transmits the revised sampling configuration to the client. The client will then sample the data based on the revised sampling configuration. On the other hand, if the checksums match, the sampling configuration transmitter 510 may not transmit the revised sampling configuration.

Figure 8:
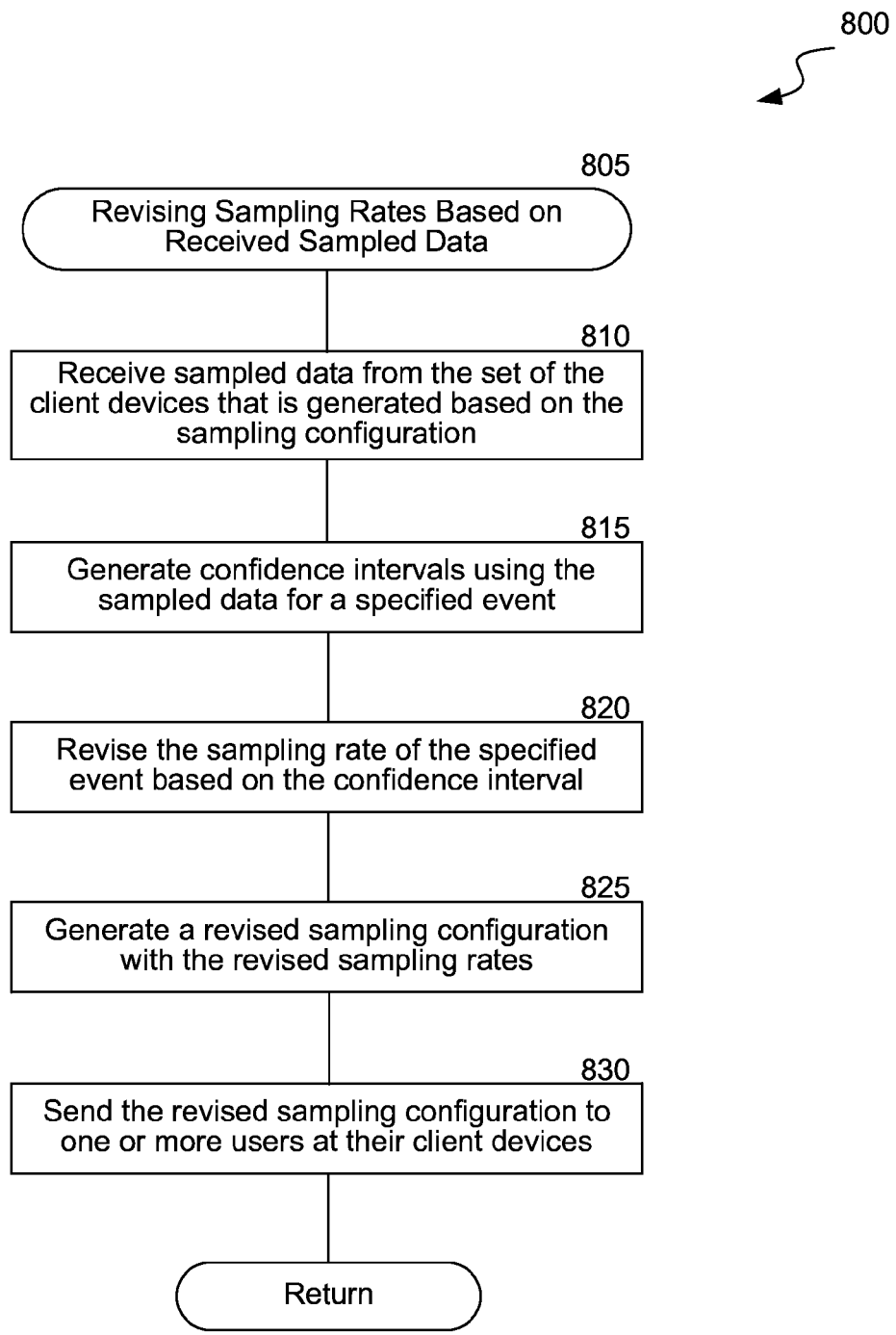
FIG. 8 is a flow diagram of a process of revising sampling rates of events based on sampled data received from client devices, consistent with various embodiments.

FIG. 8 is a flow diagram of a process 800 of revising sampling rates of events based on sampled data received from client devices, consistent with various embodiments. The process 800 may be executed in the environment 100 of FIG. 1A. The sampling rates of the events can be changed manually by a user, e.g., an administrator of the server 105, application 110 and/or the log framework 120. In some embodiments, the sampling rates can be adjusted automatically by the log framework 120. The process 800 begins at block 805, and at block 810, the sampled data receiver 515 receives the sampled data, e.g., sampled data 130, from the clients 150, e.g., that is generated based on the sampling configuration 125 transmitted to the first client 150a as described at least with reference to FIGS. 1 and 6.

At block 815, the sampled data analyzer 530 analyzes the sampled data received from the clients 150 and generates a confidence interval for a specified event using the sampled data. In some embodiments, a confidence interval is a type of interval estimate of a population parameter. It is an observed interval (e.g., calculated from the observations), in principle different from sample to sample, that frequently includes the parameter of interest if the experiment is repeated. How frequently the observed interval contains the parameter is determined by the confidence level or confidence coefficient.

The confidence interval can be input to the sampling configuration generator 505, and at block 820, the sampling configuration generator 505 can revise the sampling rate of the specified event based on the confidence interval. In some embodiments, the administrator can change the sampling rate based on the confidence interval.

At block 825, the sampling configuration generator 505 generates a revised sampling configuration with the revised sampling rate.

At block 830, the sampling configuration transmitter 510 sends the revised sampling configuration to one or more users at their client devices, e.g., as described at least with reference to FIG. 7.

Figure 9:
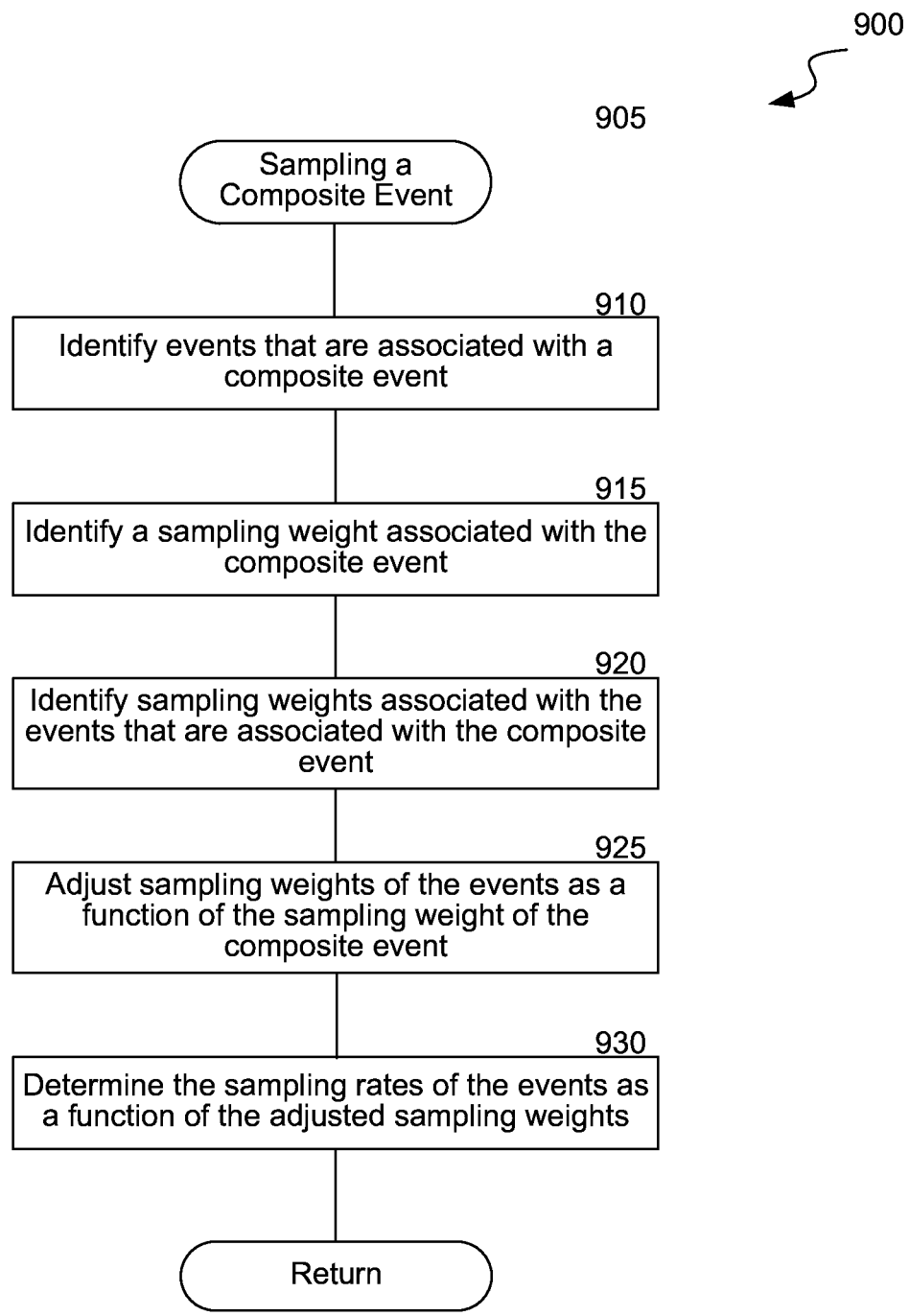
FIG. 9 is a flow diagram of a process of sampling a composite event at client devices of FIG. 1A, consistent with various embodiments.

FIG. 9 is a flow diagram of a process 900 of sampling a composite event at client devices of FIG. 1A, consistent with various embodiments. The process 900 may be executed in the environment 100 of FIG. 1. As described above, the sampling rates of different events can be different. Some events can be part of a composite event. A composite event is typically a collection of related events. In some embodiments, when a composite event is sampled, each of the related events that collectively form the composite event is also sampled regardless of the sampling rates of the related events. For example, in a social networking application, sharing of a photo album by a user can be a composite event, which can be a collection of related events such as creating a photo album, uploading pictures to the photo album, tagging users in the pictures, face recognition of the people in the picture, identifying a set of users to share the album with, sharing the album, etc. The following paragraphs describe the generation of a sampling configuration for sampling composite events.

The process 900 begins at block 905, and at block 910, the sampling configuration generator 505 identifies events that are associated with a composite event. In some embodiments, the metadata of events can indicate whether an event is a composite event and also the list of events that are related to the composite event.

At block 915, the sampling weight determination module 520 identifies a sampling weight associated with the composite event. At block 920, the sampling weight determination module 520 identifies sampling weights associated with the events that are associated with the composite event.

At block 925, the sampling weight determination module 520 adjusts the sampling weights of the events as a function of the sampling weight of the composite event such that weights of the associated events are similar to the weight of the composite event.

At block 930, the sampling configuration generator 505 determines the sampling rates of the events as a function of the adjusted sampling weights, and the process returns.

Figure 10:
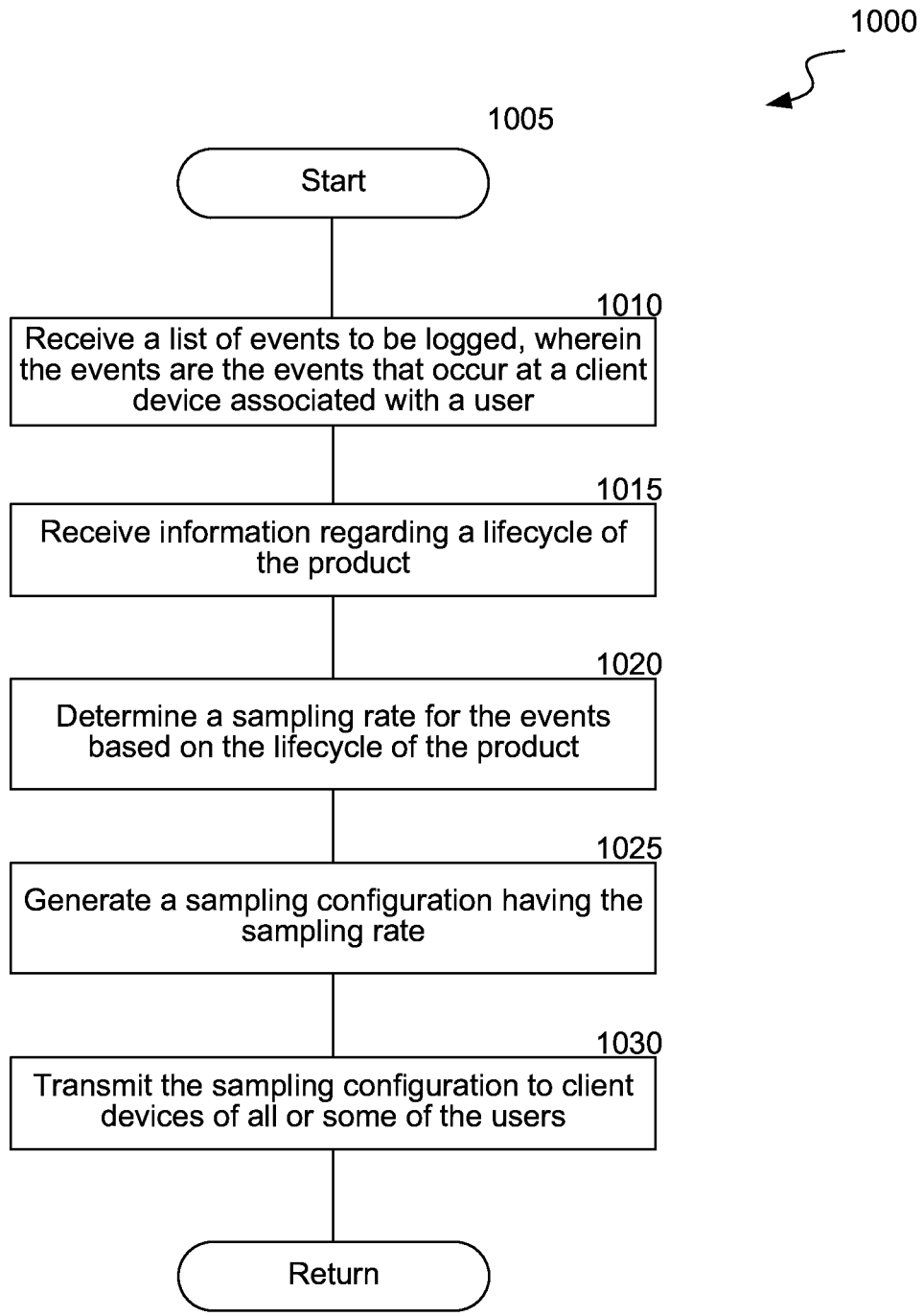
FIG. 10 is a flow diagram of a process of controlling a sampling rate of the events of a product based on lifecycle information of the product, consistent with various embodiments.

FIG. 10 is a flow diagram of a process 1000 of controlling a sampling rate of the events of a product based on lifecycle information of the product, consistent with various embodiments. In some embodiments, the process 1000 can be implemented in the environment 100 of FIG. 1A. In some embodiments, the product can be an application, e.g., app 115. The process 1000 starts at block 1005 and at block 1010, the sampling configuration generator 505 receives a list of events of the app 115 to be sampled at the client devices 150. In some embodiments, the application 110 can provide the list of events to be sampled.

At block 1015, the lifecycle information processing module 535 determines the lifecycle information of the product. For example, the lifecycle information processing module 535 can obtain the lifecycle information 135 of the app 115 from metadata of the app 115.

At block 1020, the sampling configuration generator 505 determines the sampling rate of the events based on the lifecycle information of the product, e.g., obtained in block 1015. In some embodiments, the sampling rate or a range of sampling rates for a specified lifecycle stage is predetermined, e.g., specified by the administrator. In some embodiments, the sampling configuration generator 505 determines the sampling rate based on one or more parameters of the lifecycle stage, e.g., parameters specified in FIG. 1B.

At block 1025, the sampling configuration generator 505 generates a sampling configuration that includes various data, e.g., sampling rates, list of events to be sampled, that is required by the clients 150 to sample the events. In some embodiments, the sampling configuration is generated as described at least with reference to FIGS. 2 and 6.

At block 1030, the sampling configuration transmitter 510 sends the sampling configuration to client devices of some or all of the users. In some embodiments, the sampling configuration transmitter 510 selects a set of users from whom the events are to be sampled, and the sampling configuration transmitter 510 sends the sampling configuration to client devices of the selected set of users. In some embodiments, the sampling configuration transmitter 510 determines the number of users from whom the events are to be sampled as a function of volume of the data generated by the sampling in the specified lifecycle stage and the total number of users using the app 115, e.g., as described at least with reference to FIG. 6.

Figure 11:
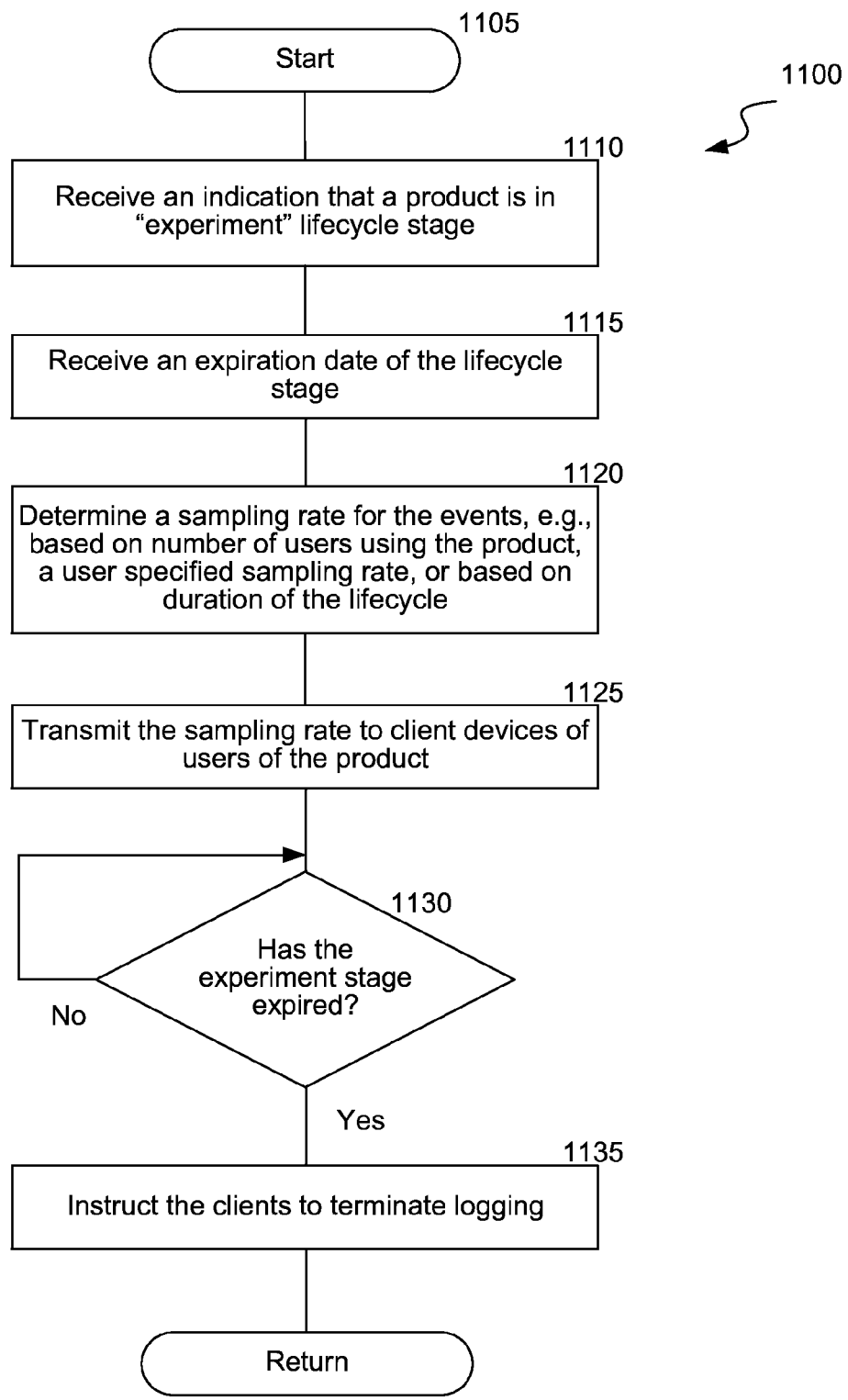
FIG. 11 is a flow diagram of a process of controlling a sampling rate of the events of a product during a first lifecycle stage of the product, consistent with various embodiments.

FIG. 11 is a flow diagram of a process 1100 of controlling a sampling rate of the events of a product during a first lifecycle stage of the product, consistent with various embodiments. In some embodiments, the process 1100 can be implemented in the environment 100 of FIG. 1A. In some embodiments, the product can be an application, e.g., app 115. The process 1100 starts at block 1105 and at block 1110, the lifecycle information processing module 535 receives an indication that the lifecycle stage of the app 115 is an experiment stage, e.g., experiment stage 165 illustrated in FIG. 1B. In some embodiments, the lifecycle information processing module 535 retrieves the lifecycle information from metadata associated with the app 115. In some embodiments, an application associated with the app 115, e.g., application 110 which is a server side portion of the app 115 provides the metadata of the app 115.

In some embodiments, the experiment stage 165 is a stage where the product is being experimented in a closed group of candidate users, e.g., before the app 115 is publicly launched. The closed group can be within an organization or external to the organization. In the experiment stage 165 of the lifecycle of the app 115, data may need to be logged during the entire phase of the experimentation, e.g., to analyze the behavior of the product and make any necessary changes to improve the efficiency or correct any errors.

At block 1115, the lifecycle information processing module 535 receives an expiration date of the experiment stage for the app 115. The expiration date can indicate a date until which the app 115 is in the experiment stage, and is a date after which the sampling of the events by the clients can be terminated. In some embodiments, the lifecycle information processing module 535 retrieves the expiration date from the metadata associated with the app 115.

At block 1120, the sampling configuration generator 505 determines a sampling rate for the events of the app 115. In some embodiments, the sampling rate or a range of sampling rates for an experiment stage 165 is predetermined, e.g., specified by the administrator. In some embodiments, the sampling configuration generator 505 determines the sampling rate based on one or more parameters of the lifecycle stage, e.g., number of users using the app 115 in the experiment stage 165, amount of data being logged. Since the sampled data may be used to analyze the behavior of the product and make any necessary changes to the app 115, e.g., before the app 115 is publicly available, typically, in the experiment stage 165 the sampling rate is high, e.g., 100%, where almost all occurrences of the selected events may be sampled. However, if the number of users using the app 115 in the experiment stage 165 is above a specified threshold, the sampling rate may be decreased, e.g., as the volume of data increases.

Further, the type of the events sampled in the experiment stage 165 can include a "very-high" range of events, e.g., as various aspects of the app 115 may have to be analyzed. In some embodiments, the list of events to be sampled during the experiment stage 165 can include events that have tags indicating they are to be sampled during experiment stage 165. The sampling configuration generator 505 can include the list of events and the sampling rate in a sampling configuration.

At block 1125, the sampling configuration transmitter 510, transmits the sampling configuration including the sampling rate and the list of events to the users of the app 115. In some embodiments, all of the users may be sampled during the experiment stage, e.g., as more data may be required to analyze the behavior product.

At determination block 1130, the lifecycle information processing module 535 determines whether the experiment stage has expired. For example, the lifecycle information processing module 535 can determine whether the experiment has expired by determining if the expiration date is past the current date.

If the experiment stage has expired, at block 1135, the sampling configuration transmitter 510 sends an instruction to the clients to terminate the sampling, and the process 1100 returns. On the other hand, if the experiment stage 165 has not expired, the lifecycle information processing module 535 can continue monitoring a state of the experiment stage. The sampled data receiver 515 can continue receiving the sampled data from the clients until the experiment stage 165 expires.

Figure 12:
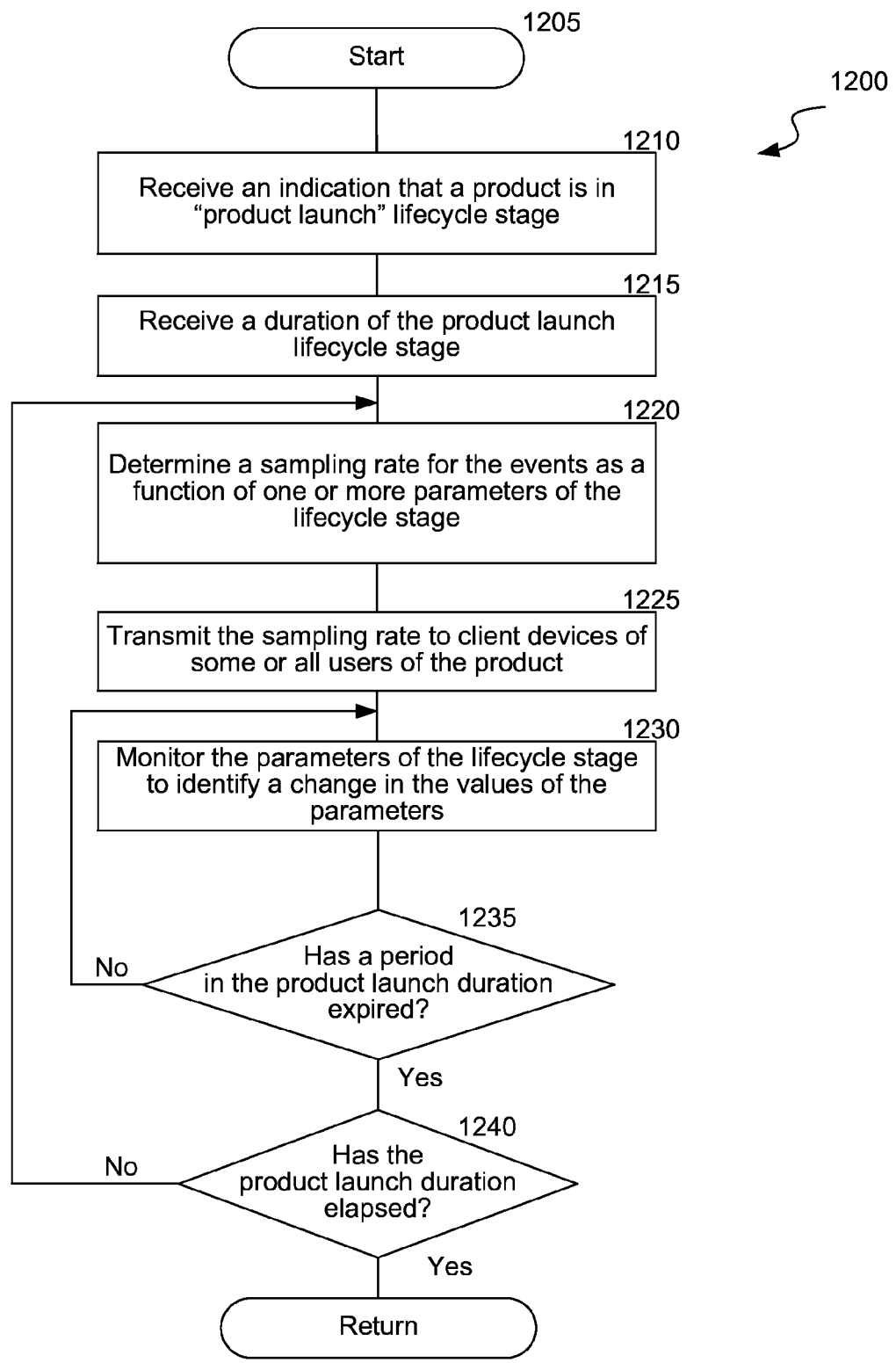
FIG. 12 is a flow diagram of a process of controlling a sampling rate of the events of a product during a second lifecycle stage of the product, consistent with various embodiments.

FIG. 12 is a flow diagram of a process 1200 of controlling a sampling rate of the events of a product during a second lifecycle stage of the product, consistent with various embodiments. In some embodiments, the process 1200 can be implemented in the environment 100 of FIG. 1A. In some embodiments, the product can be an application, e.g., app 115. The process 1200 starts at block 1205 and at block 1210, the lifecycle information processing module 535 receives an indication that the lifecycle stage of the app 115 is a product launch stage, e.g., product launch stage 170 illustrated in FIG. 1B. In some embodiments, the lifecycle information processing module 535 retrieves the lifecycle information from metadata associated with the app 115. In some embodiments, the product launch stage is a stage where the app 115 is made available to a limited number of users, e.g., more number of users than the users during the experiment stage 165 but less than the number of users when the app 115 is in the mature stage 175.

At block 1215, the lifecycle information processing module 535 receives a duration of the product launch lifecycle stage ("product launch duration"). The product launch duration can be a duration during which the app 115 is expected to in the product launch stage 170 and is available to the limited number of users. For example, the duration of the product launch stage 170 for the app 115 can be "4" weeks. The product launch duration can be defined by the administrator. In some embodiments, the duration is retrieved from the metadata of the app 115.

At block 1220, the sampling configuration generator 505 determines a sampling rate for the events of the app 115. In some embodiments, the sampling rate or a range of sampling rates for the product launch stage 170 is predetermined, e.g., specified by the administrator. In some embodiments, the sampling configuration generator 505 determines the sampling rate based on one or more parameters of the lifecycle stage, e.g., number of users using the app 115 in the product launch stage 170, amount of data being logged, a change in the number of users using the app over the duration of the product launch.

In some embodiments, the list of events to be sampled during the product launch stage 170 can include events that have tags indicating that the events are to be sampled during the product launch stage 170. The sampling configuration generator 505 can include the list of events and the sampling rate in a sampling configuration.

At block 1225, the sampling configuration transmitter 510, transmits the sampling configuration including the sampling rate and the list of events to the users of the app 115. Some or all of the users using the app 115 in the product launch stage 170 can be sampled. In some embodiments, a subset of the users may be sampled during the product launch stage 170, e.g., as high volume of data may be generated if all the users are sampled. In some embodiments, all the users may be sampled if the volume of data generated is below a specified threshold. The sampling configuration transmitter 510 transmits the sampling configuration to the selected set of users. After receiving the sampling configuration, the clients can sample the events based on the sampling configuration.

At block 1230, the lifecycle information processing module 535 monitors a change in various parameters of the lifecycle, e.g., number of users, and a volume of data being sampled. The product launch stage 170 can have various periods within the product launch duration. In some embodiments, the number of users to whom the app 115 is made available during the product launch stage 170 can be increased progressively over duration of the product launch stage 170. For example, in a first period of the product launch duration, the app 115 may be made available to a first number of users, and then to more number of users in a second period and so on. In some embodiments, although the app 115 is made available to a first set of users in the product launch stage 170, the number of users in an initial period can be less, e.g., not many users may be using the app 115, and can increase over time, e.g., as the app 115 becomes more popular among the first set of users. So, as the users change, the volume of data being sampled can also change. For example, if the number of users using the app 115 increases the volume of data being sampled can also increase. In another example, the volume of data being sampled can also increase if the amount of user interaction of a fixed set of users with the app 115 increases. Accordingly, the lifecycle information processing module 535 monitors the various parameters to determine the change in values of the parameters.

At determination block 1235, the lifecycle information processing module 535 determines whether a specified period has elapsed in the product launch stage 170. If the specified period has not elapsed, the lifecycle information processing module 535 continues monitoring the various parameters of the lifecycle at block 1230. If the specified period has elapsed, at determination block 1240, the lifecycle information processing module 535 determines whether the product launch duration has elapsed. If the product launch duration has elapsed, the process 1200 returns. In some embodiments, when the process 1200 returns, the sampling rate can be revised to a sampling rate for a post product launch stage, e.g., mature stage 175.

On the other hand, if the product launch duration has not elapsed, the control is transferred to block 1220 where the sampling configuration generator 505 determines a revised sampling rate, which is determined as a function of the changed parameters determined in block 1230. Accordingly, the events in the app 115 can be sampled at different sampling rates at different periods of the product launch stage 170 as the number of users and/or the volume of data being sampled changes over time.

Figure 13:
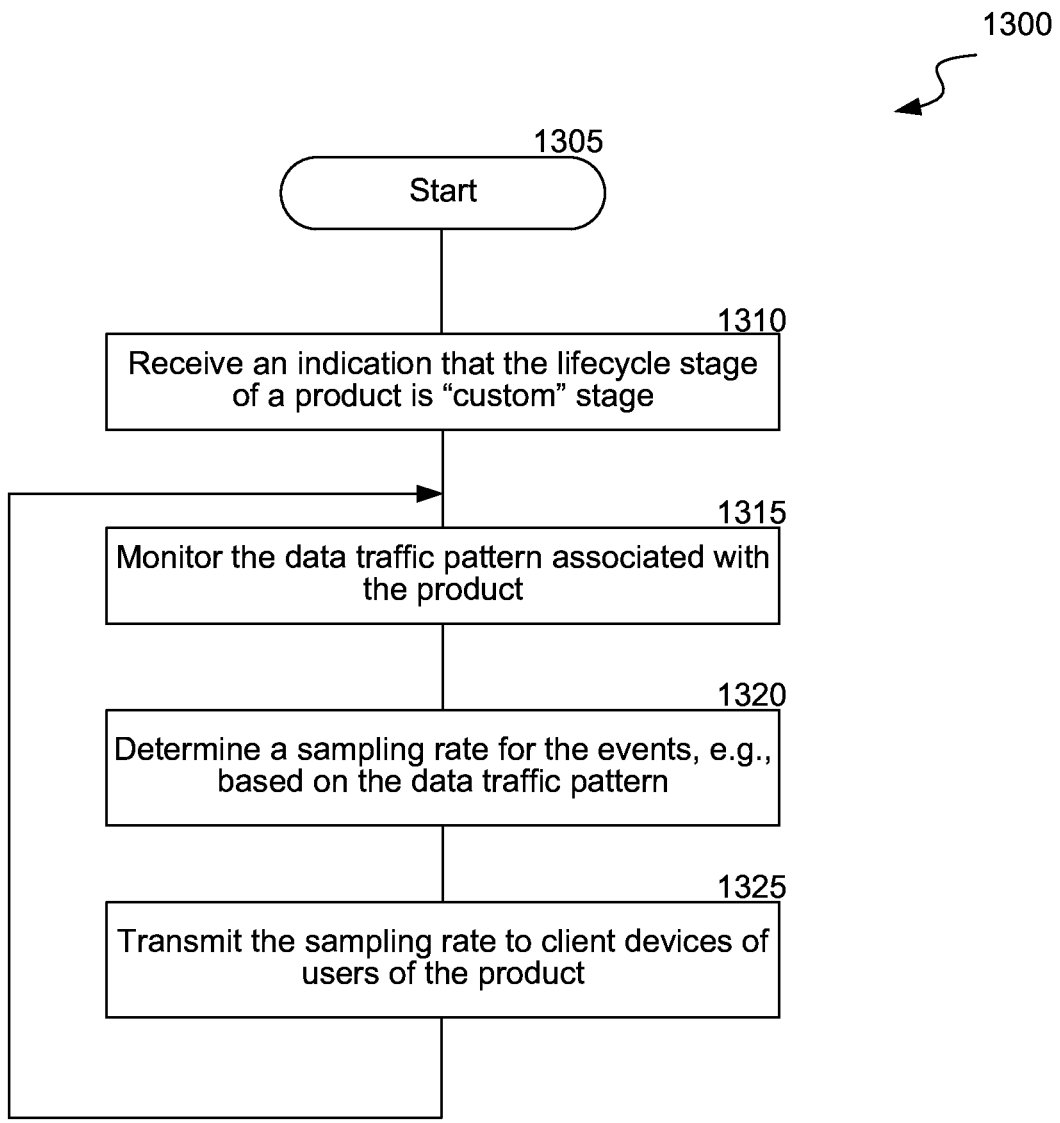
FIG. 13 is a flow diagram of a process of controlling a sampling rate of the events of a product during a third lifecycle stage of the product, consistent with various embodiments

FIG. 13 is a flow diagram of a process 1300 of controlling a sampling rate of the events of a product during a third lifecycle stage of the product, consistent with various embodiments. In some embodiments, the process 1300 can be implemented in the environment 100 of FIG. 1A. In some embodiments, the product can be an application, e.g., app 115. The process 1300 starts at block 1305 and at block 1310, the lifecycle information processing module 535 receives an indication that the lifecycle stage of the app 115 is a "custom" stage. A product having the lifecycle stage as custom stage, can be in any of the experiment stage 165, the product launch stage 170 or the mature stage 175 illustrated in FIG. 1B. In some embodiments, the lifecycle information processing module 535 retrieves the lifecycle information from metadata associated with the app 115. In some embodiments, the lifecycle information processing module 535 determines that the app 115 is in custom stage if the metadata of the app 115 does not include any information regarding the lifecycle stage of the app 115.

At block 1315, the lifecycle information processing module 535 monitors the data traffic pattern associated with the app 115, e.g., to identify a lifecycle stage and a sampling rate accordingly. In some embodiments, determining the data traffic pattern can include determining one or more of a number of users using the app 115, a change in the number of users over a specified period, a volume of data being sampled, a change in the volume of data being sampled over a period, etc.

At block 1320, the sampling configuration generator 505 determines the sampling rate of the events for the app 115 based on the data traffic pattern. In some embodiments, the lifecycle information processing module 535 determines the lifecycle stage of the app 115 based on the analysis of the above parameters in the data traffic pattern. For example, if the number of users to whom the app 115 is made available is constant for a specified period, the number of users to whom the app 115 is made available is below a specified threshold, and/or the users are part of a closed group, then the lifecycle information processing module 535 determines the lifecycle stage of the app 115 as the experiment stage 165. After determining the lifecycle stage, the sampling configuration generator 505 can determine the sampling rate of the events for the app 115 accordingly based on the lifecycle stage information, e.g., as described at least with reference to FIGS. 11 and 12.

At block 1325, the sampling configuration transmitter 510, transmits the sampling rate to the users of the app 115, and the lifecycle information processing module 535 can continue monitoring the data traffic pattern at block 1315. After receiving the sampling rate, the clients can sample the events based on the received sampling rate.

Figure 14:
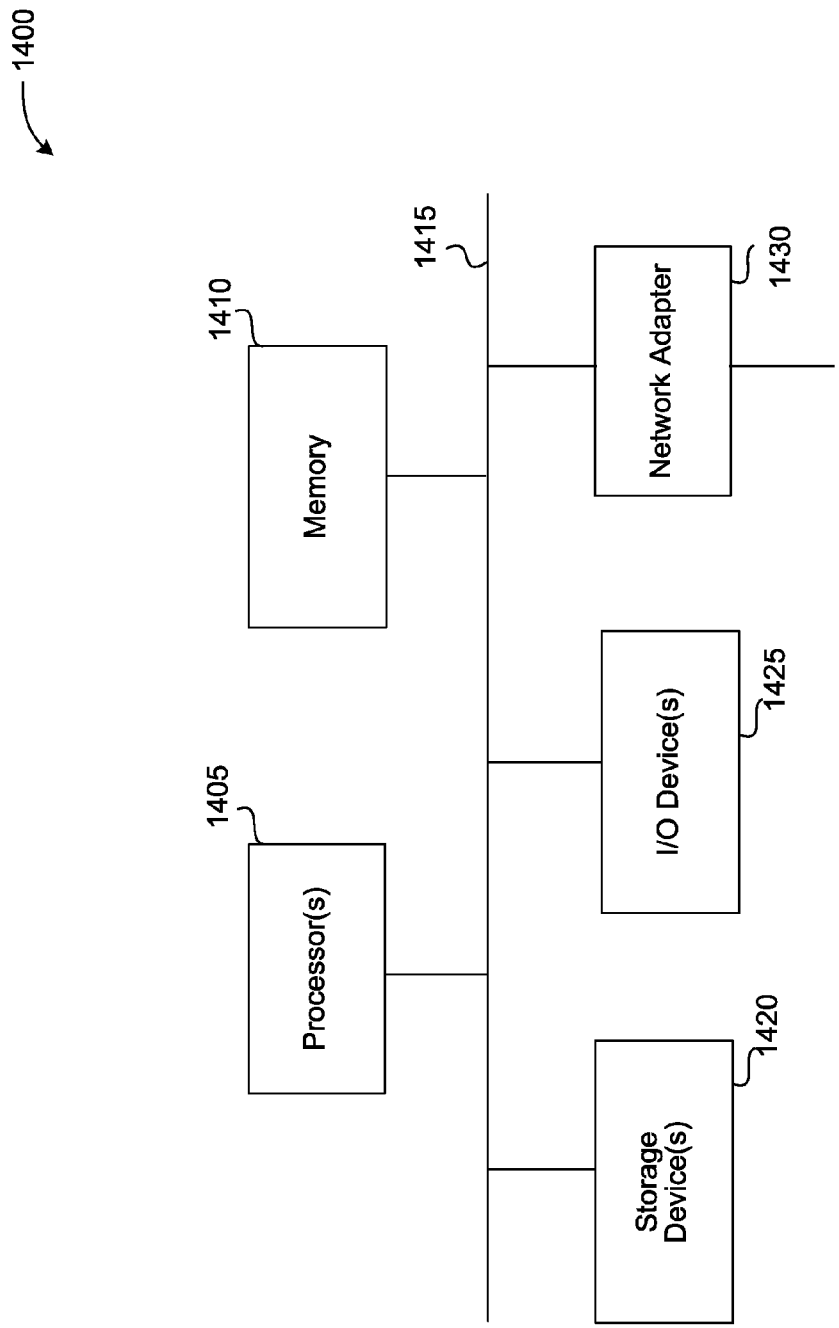
FIG. 14 is a block diagram of a processing system that can implement operations of the present invention.

FIG. 14 is a block diagram of a computer system as may be used to implement features of some embodiments of the disclosed technology. The computing system 1400 may be used to implement any of the entities, components or services depicted in the examples of FIGS. 1-9 (and any other components described in this specification). The computing system 1400 may include one or more central processing units ("processors") 1405, memory 1410, input/output devices 1425 (e.g., keyboard and pointing devices, display devices), storage devices 1420 (e.g., disk drives), and network adapters 1430 (e.g., network interfaces) that are connected to an interconnect 1415. The interconnect 1415 is illustrated as an abstraction that represents any one or more separate physical buses, point to point connections, or both connected by appropriate bridges, adapters, or controllers. The interconnect 1415, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1410 and storage devices 1420 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media) and computer-readable transmission media.

The instructions stored in memory 1410 can be implemented as software and/or firmware to program the processor(s) 1405 to carry out actions described above. In some embodiments, such software or firmware may be initially provided to the processing system 1400 by downloading it from a remote system through the computing system 1400 (e.g., via network adapter 1430).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method performed by a computing system, comprising:
   receiving, at a server, a list of multiple events to be logged at a client device associated with a user, wherein the events are associated with a software product executing at the client device;
   receiving, at the server, information regarding a lifecycle of the software product, wherein the information includes a specified stage of multiple stages of the lifecycle;
   determining, by the server, a sampling rate for the events based on the specified stage of the lifecycle of the software product, wherein the server determines different sampling rates for different stages of the lifecycle of the software product in which a first sampling rate of the different sampling rates corresponds to a first stage of the multiple stages and a second sampling rate of the different sampling rates corresponds to a second stage of the multiple stages, wherein the sampling rate decreases as the software product progresses from the first stage to the second stage, wherein the sampling rate is decreased as time progresses in any of the first stage or the second stage to generate a first set of sampling rates, wherein determining the sampling rate for the events includes:
      determining a weight associated with an event of the events, and determining a specified sampling rate of the event further based on the weight of the event;
generating, by the server, a sampling configuration having the sampling rate; and
transmitting, by the server, the sampling configuration to multiple client devices of multiple users of the software product for causing the client devices to log the events based on the sampling rate, the transmitting further including:
  generating the sampling configuration with the first set of sampling rates, and
  transmitting the sampling configuration to client devices of a specified number of users of the software product, wherein the specified number is decreased as a total number of users using the software product increases.

2. The method of claim 1, wherein receiving the stage of the lifecycle of the software product includes:
  receiving information indicating the stage of the lifecycle is the second stage, and
  receiving a specified duration of the second stage, wherein the second stage is a stage of lifecycle for which the events are to be sampled at different sampling rates at different periods of the duration.

3. The method of claim 2, wherein determining the sampling rate for the events includes adjusting the sampling rate based on an amount of data logged at client devices of users of the software product.

4. The method of claim 3, wherein adjusting the sampling rate includes adjusting the sampling rate in an inverse proportion to the amount of data logged.

5. The method of claim 1, wherein receiving the information regarding the lifecycle of the software product includes:
  receiving information indicating that the specified stage of the lifecycle is the first stage, and
  receiving an expiration date of the first stage, wherein the first stage is a stage of lifecycle for which the logging of the events is to be terminated after the expiration date.

6. The method of claim 5, wherein determining the sampling rate for the events includes determining that a logging of the events is to be terminated after the expiration date.

7. The method of claim 5, wherein determining the sampling rate for the events based on the lifecycle of the software product includes determining that the first sampling rate is to be constant for entire duration of the first stage.

8. The method of claim 7, wherein generating the sampling configuration further includes:
  generating the sampling configuration with the first sampling rate, and
  transmitting the sampling configuration to client devices of all users of the software product.

9. A computer-readable storage medium storing computer-readable instructions, the instructions comprising:
  instructions for receiving, at a server, a list of multiple events to be logged at a client device associated with a user, wherein the events are associated with a software product executing at the client device;
  instructions for receiving, at the server, information regarding a lifecycle of the software product and a total number of the users of the software product, wherein the information includes a specified stage of multiple stages of the lifecycle;
  instructions for determining, by the server, a sampling rate for the events based on the lifecycle of the software product, wherein different sampling rates are determined for different stages of the lifecycle of the software product in which a first sampling rate of the different sampling rates corresponds to a first stage of the multiple stages and a second specified sampling rate of the different sampling rates corresponds to a second stage of the multiple stages, wherein the sampling rate decreases as the software product progresses from the first stage to the second stage, wherein the sampling rate is decreased as time progresses in any of the first stage or the second stage to generate a first set of sampling rates, wherein determining the sampling rate for the events includes:
    determining a weight associated with an event of the events, and
    determining a specified sampling rate of the event further based on the weight of the event; and
  instructions for transmitting, by the server, the sampling rate to client devices of a specified number of the users for causing the client devices to log the events at the sampling rate, the specified number of the users determined as a function of the lifecycle of the software product and the total number of users of the software product, the transmitting further including:
    generating the sampling configuration with the first set of sampling rates, and
    transmitting the sampling configuration to client devices of a specified number of users of the software product, wherein the specified number is decreased as a total number of users using the software product increases.

10. The computer-readable storage medium of claim 9, wherein the instructions for receiving the information regarding the lifecycle include:
  instructions for receiving an indication that the lifecycle is in "experiment" stage, a "product launch" stage, or a "custom" stage, wherein at least one of a pattern in which the events occur or a pattern in which the number of users using the software product changes during the lifecycle of the software product is different for different lifecycle stages.

11. The computer-readable storage medium of claim 9, wherein the instructions for receiving the information regarding the lifecycle include instructions for:
  receiving (a) an indication that the lifecycle is of a "product launch" stage and (b) a specified duration of the lifecycle, wherein the software product launch stage is a stage of lifecycle for which the events are to be sampled at different sampling rates at different periods of the duration.

12. The computer-readable storage medium of claim 11, wherein the instructions for transmitting the sampling rate to the client devices of the specified number of the users include instructions for determining the specified number of the users the sampling rate is to be transmitted to as inversely proportional to the total number of users using the software product during the specified duration of the lifecycle.

13. The computer-readable storage medium of claim 9, wherein the instructions for determining the sampling rate for the events include instructions for:
  receiving an indication that the lifecycle is of a "custom" stage,
  determining, in response to the custom stage, data traffic received at the server, and determining the sampling rate based on the data traffic, the determining including continuously adjusting the sampling rate in response to a change in the data traffic.

14. The computer-readable storage medium of claim 13, wherein the data traffic is indicative of a pattern of one or more of (a) occurrences of the event or (b) change in the number of users using the software product over a specified duration.

15. A system, comprising:

a processor;

a first module configured to receive, at a server, a list of multiple events to be logged at a client device associated with a user, wherein the events are associated with a software product executing at the client device;

a second module configured to receive, at the server, information regarding a lifecycle of the software product, wherein the information includes a specified stage of multiple stages of the lifecycle;

a third module configured to determine, by the server, a sampling rate for the events based on the lifecycle of the software product, wherein the third module is configured to determine different sampling rates for different stages of the lifecycle of the software product in which a first sampling rate of the different sampling rates corresponds to a first stage of the multiple stages and a second specified sampling rate of the different sampling rates corresponds to a second stage of the multiple stages, wherein the sampling rate decreases as the software product progresses from the first stage to the second stage, wherein the sampling rate is decreased as time progresses in any of the first stage or the second stage to generate a first set of sampling rates, wherein determining the sampling rate for the events includes:

determining a weight associated with an event of the events, and determining a specified sampling rate of the event further based on the weight of the event;

a fourth module configured to generate a sampling configuration having the sampling rate; and a fifth module configured to transmit the sampling configuration to client devices of a specified number of users using the software product, wherein the fifth module is further configured to:

generate the sampling configuration with the first set of sampling rates, and transmit the sampling configuration to client devices of a specified number of users of the software product, wherein the specified number is decreased as a total number of users using the software product increases.

16. The system of claim 15, wherein the third module is further configured to:

receive an indication that the lifecycle is of a "custom" stage, determine, in response to the custom stage, data traffic received at the server, and determine the sampling rate based on the data traffic, the determining including continuously adjusting the sampling rate in response to a change in the data traffic.

17. The system of claim 15, wherein the data traffic is indicative of a pattern of one or more of (a) occurrences of the event or (b) change in the number of users using the software product over a specified duration.

* * * * *